(12) United States Patent
Kondo et al.

(10) Patent No.: US 10,707,778 B2
(45) Date of Patent: Jul. 7, 2020

(54) CONTROL APPARATUS FOR ROTARY ELECTRIC MACHINE

(71) Applicant: DENSO CORPORATION, Kariya, Aichi-pref. (JP)

(72) Inventors: Kosuke Kondo, Kariya (JP); Yoo Tanaka, Kariya (JP); Jun Ishida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/260,802

(22) Filed: Jan. 29, 2019

(65) Prior Publication Data
US 2019/0238067 A1 Aug. 1, 2019

(30) Foreign Application Priority Data

Jan. 30, 2018 (JP) .................................. 2018-013138

(51) Int. Cl.
*H02M 7/527* (2006.01)
*H02P 27/08* (2006.01)

(52) U.S. Cl.
CPC ............ *H02M 7/527* (2013.01); *H02P 27/08* (2013.01)

(58) Field of Classification Search
CPC .................. H02P 27/08–14; H02M 7/525–527
See application file for complete search history.

(56) References Cited

U.S. PATENT DOCUMENTS

| 4,723,201 A * | 2/1988 | Tanamachi ............... H02P 27/08 318/811 |
| 9,013,137 B2 * | 4/2015 | Aoki .......................... H02P 6/18 318/810 |
| 2012/0032629 A1 * | 2/2012 | Peterson ................. H02P 27/04 318/723 |
| 2018/0034402 A1 * | 2/2018 | Yoshimura ............ H02P 27/047 |
| 2018/0241336 A1 * | 8/2018 | Uemura .................. H02P 21/05 |

FOREIGN PATENT DOCUMENTS

JP 2013-223308 A 10/2013

* cited by examiner

*Primary Examiner* — Daniel Kessie
*Assistant Examiner* — Peter M Novak
(74) *Attorney, Agent, or Firm* — Oliff PLC

(57) ABSTRACT

In a control apparatus, a controller performs comparison between a command voltage and a cyclic carrier signal to thereby perform one of pulse-width modulation upon each of first positive and negative peaks of the command voltage being within or identical to the corresponding one of second positive and negative peaks of the cyclic carrier signal, and single-pulse modulation upon each of the first positive and negative peaks of the command voltage being outside the corresponding one of the second positive and negative peaks of the cyclic carrier signal. The pulse-width modulation generates, for each cycle of the command voltage, plural drive pulses based on a result of the comparison. The single-pulse modulation generates, for each cycle of the command voltage, a single positive pulse and a single negative pulse for each cycle of the command voltage based on a result of the comparison.

11 Claims, 16 Drawing Sheets

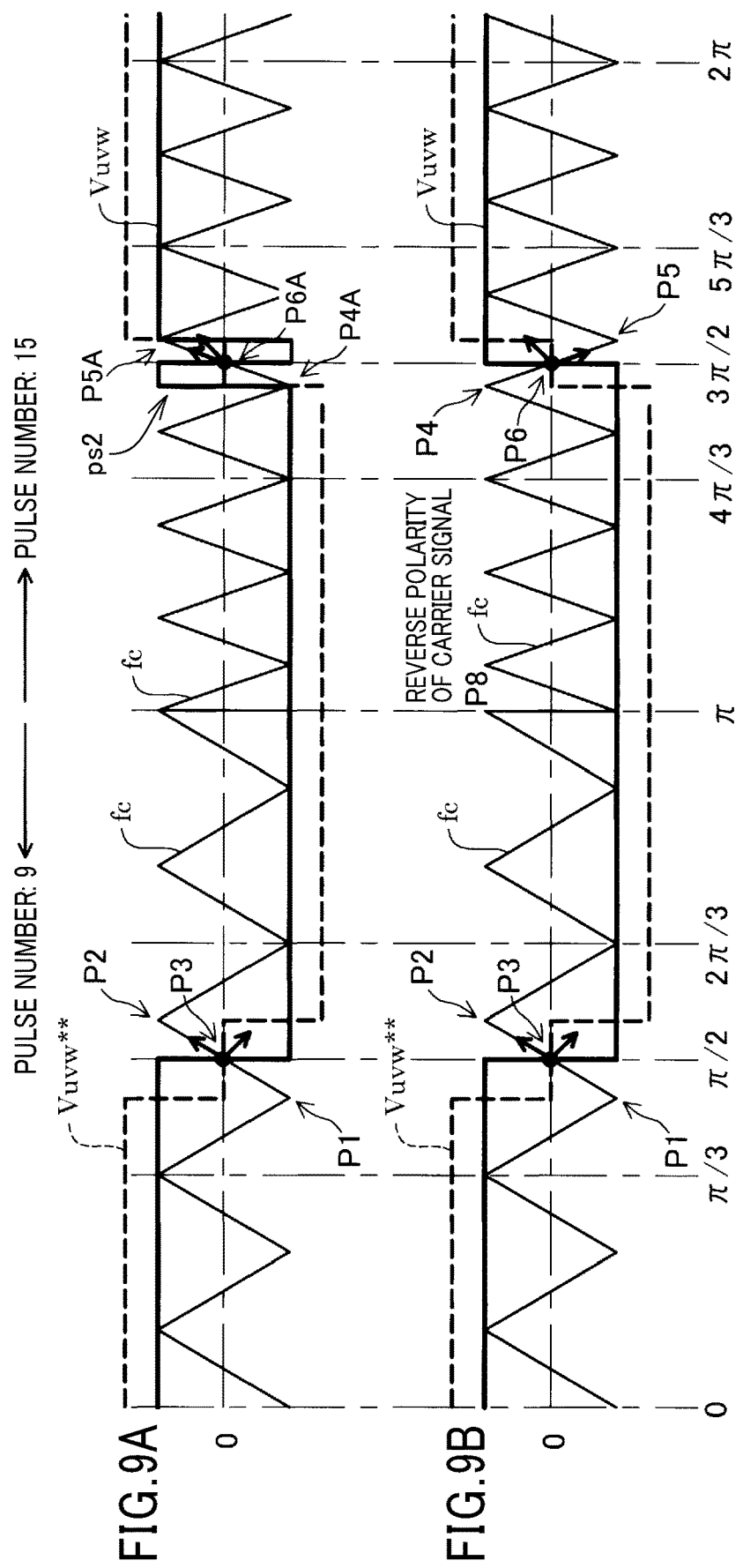

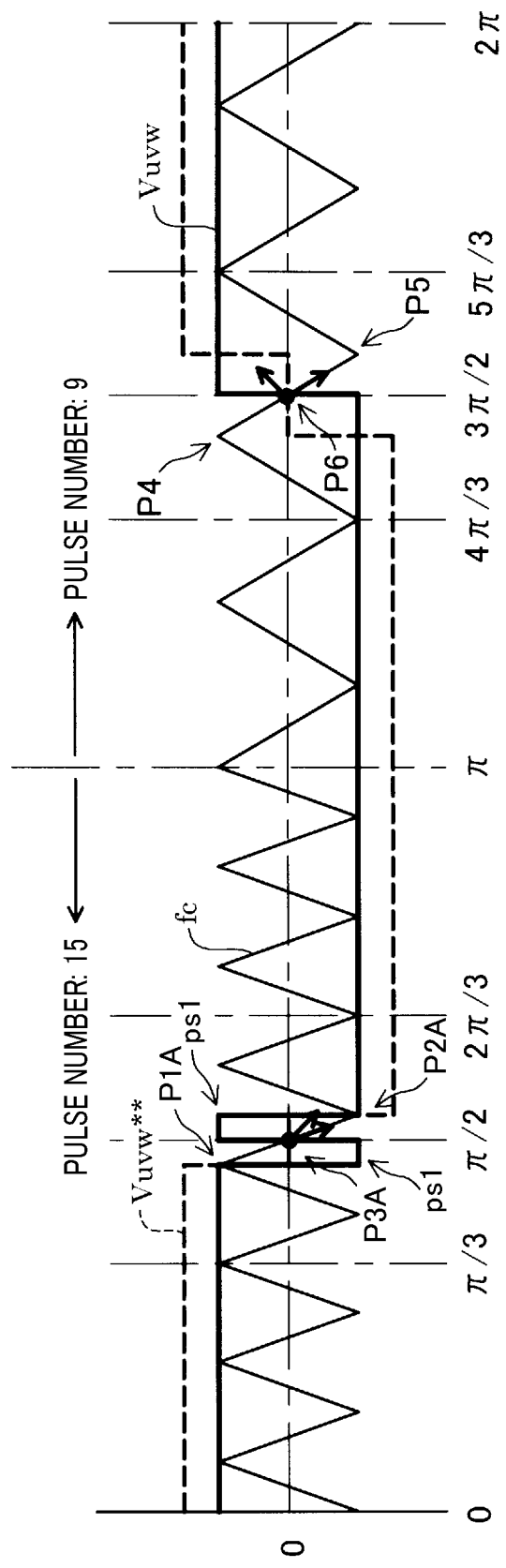

CONTROL APPARATUS FOR ROTARY ELECTRIC MACHINE

CROSS REFERENCE TO RELATED APPLICATIONS

This application is based on and claims the benefit of priority from Japanese Patent Application 2018-013138 filed on Jan. 30, 2018, the disclosure of which is incorporated in its entirety herein by reference.

TECHNICAL FIELD

The present disclosure relates to control apparatuses for a rotary electric machine.

BACKGROUND

Japanese Patent Application Publication No. 2013-223308 discloses a control apparatus for a synchronous motor. The disclosed control apparatus changes the number of triangular pulses of a periodical triangular carrier wave during one phase of each of three-phase sinusoidal command voltages in accordance with the rotational speed of the synchronous motor.

In particular, the disclosed control apparatus switches the number of triangular pulses of the triangular carrier wave during one phase of each of the three-phase sinusoidal command voltages to a different number at suitable timing to thereby reduce current ripples generated due to a phase difference between the triangular carrier wave and each of the three-phase sinusoidal command voltages. This current ripple reduction results in reduction of torque shock.

SUMMARY

The above-published patent document may fail to sufficiently consider single pulse modulation, i.e. rectangular pulse modulation, which uses a periodical rectangular wave whose absolute amplitude is higher than the absolute amplitude of each three-phase command voltage for each period of the corresponding phase command voltage.

In view of the circumstances set forth above, an aspect of the present disclosure seeks to provide control apparatuses, each of which is capable of addressing the above issue set forth above.

According to a first exemplary aspect of the present disclosure, there is provided a control apparatus for controlling, via a power converter for power conversion of a direct-current voltage input thereto, a rotary electric machine that has a rotating magnetic field. The control apparatus includes a command voltage generator configured to generate a command voltage with first positive and negative peaks relative to a zero voltage level for at least one phase of the multiphase rotary electric machine, and a carrier signal generator configured to generate a cyclic carrier signal. The cyclic carrier signal has cyclic carrier pulses with second positive and negative peaks relative to the zero voltage level, and a phase synchronized with the rotating magnetic field. The control apparatus includes a controller configured to control the carrier signal generator. The controller is configured to perform comparison between the command voltage and the cyclic carrier signal to thereby perform one of (1) Pulse-width modulation upon each of the first positive and negative peaks of the command voltage being within or identical to the corresponding one of the second positive and negative peaks of the cyclic carrier signal (2) Single-pulse modulation upon each of the first positive and negative peaks of the command voltage being outside the corresponding one of the second positive and negative peaks of the cyclic carrier signal The pulse-width modulation is configured to generate, for each cycle of the command voltage, plural drive pulses for driving the power converter in accordance with a result of the comparison. The single-pulse modulation is configured to generate, for each cycle of the command voltage, a single positive pulse and a single negative pulse for driving the power converter in accordance with a result of the comparison.

This configuration therefore enables both the pulse-width modulation and the single-pulse modulation to be carried out using the cyclic carrier signal without switching a modulation mode of the control apparatus between a pulse-width modulation mode and a single-pulse modulation mode.

In a second exemplary aspect, the controller can be configured to switch, in the single-pulse modulation, one of the first positive and negative peaks of the command voltage to the other thereof while preventing an occurrence of narrow-width pulses as drive pulses for the rotary electric machine. The narrow-width pulses each have a width narrower than a width of each of the single positive and negative pulses. This second exemplary aspect makes it possible to more accurately perform the single-pulse modulation.

The controller according to a third exemplary aspect can be configured to switch, in the single-pulse modulation, one of the first positive and negative peaks of the command voltage to the other thereof in synchronization with a selected one of the second positive peaks or a selected one of the second negative peaks. This configuration can prevent unnecessary switching of one of the first positive and negative peaks of the command voltage to the other thereof.

In a fourth exemplary aspect, the cyclic carrier signal is a triangular carrier signal, and the controller can be configured to cause, in the single-pulse modulation, the command voltage and the triangular carrier signal to concurrently cross the zero level such that a change direction of the command voltage and a change direction of the triangular carrier signal are opposite to each other.

The controller according to a fifth exemplary aspect can be configured to (1) Cause, in the single-pulse modulation, the command voltage and the triangular carrier signal to concurrently cross the zero level while the command voltage is increasing and the triangular carrier signal is decreasing (2) Cause, in the single-pulse modulation, the command voltage and the triangular carrier signal to concurrently cross the zero level while the command voltage is decreasing and the triangular carrier signal is increasing Each of the fourth and fifth exemplary aspects can reliably prevent an occurrence of narrow-width pulses as drive pulses for the rotary electric machine; the narrow-width pulses each have a width narrower than a width of each of the single positive and negative pulses.

In a sixth exemplary aspect, the cyclic carrier signal is a triangular carrier signal, and the controller can be configured to change, in the single-pulse modulation, the number of the carrier pulses of the triangular carrier signal for each cycle of the command voltage to a different number of a switched triangular carrier signal at a timing when a selected one of the upper and lower peaks of the triangular carrier signal is synchronized with a corresponding one of the upper and lower peaks of the switched triangular carrier signal.

This sixth aspect can switch the number of the carrier pulses of the triangular carrier signal for each cycle of the command voltage to a different number at a timing when a corresponding value of the command voltage is kept unchanged.

In a seventh aspect, the cyclic carrier signal is a triangular carrier signal, and the number of the carrier pulses of the triangular carrier signal for each cycle of the command voltage is referred to as K. The number K of the carrier pulses of the triangular carrier signal for each cycle of the command voltage satisfies the following equation K=3*(2d+1) where d is an integer equal to or more than zero. The controller can be configured to change, in the single-pulse modulation, the number K of the carrier pulses of the triangular carrier signal for each cycle of the command voltage to a different number of a switched triangular carrier signal such that an absolute value of a difference between the number K of the triangular carrier signal and the different number of the switched triangular carrier signal is a natural-number multiple of 12.

This seventh exemplary aspect can reliably prevent an occurrence of narrow-width pulses as drive pulses for the rotary electric machine; the narrow-width pulses each have a width narrower than a width of each of the single positive and negative pulses.

In an eighth exemplary aspect, the cyclic carrier signal is a triangular carrier signal, the number of the carrier pulses of the triangular carrier signal for each cycle of the command voltage is referred to as K, and the number K of the carrier pulses of the triangular carrier signal for each cycle of the command voltage can satisfy the following equation K=3*(2d+1) where d is an integer equal to or more than zero. The controller can be configured t (1) Change, in the single-pulse modulation, the number K of the carrier pulses of the triangular carrier signal for each cycle of the command voltage to a different number of a switched triangular carrier signal (2) Determine whether an absolute value of a difference between the number K of the triangular carrier signal and the different number of the switched triangular carrier signal is a natural-number multiple of 6 and a natural-number multiple of 12

(3) Perform one of a first task and a second task upon determining that the absolute value of the difference between the number K of the triangular carrier signal and the different number of the switched triangular carrier signal is a natural-number multiple of 6 but not a natural-number multiple of 12; the first task reverses a polarity of the switched triangular carrier signal, and the second task shifts the switched triangular carrier signal by a half cycle of the switched triangular carrier signal This configuration enables the command voltage and the triangular carrier signal to concurrently cross the zero level such that the change direction of the command voltage and the change direction of the triangular carrier signal are opposite to each other. This therefore can reliably prevent an occurrence of narrow-width pulses as drive pulses for the rotary electric machine; the narrow-width pulses each have a width narrower than a width of each of the single positive and negative pulses.

In a ninth exemplary aspect, the cyclic carrier signal is a triangular carrier signal, the number of the carrier pulses of the triangular carrier signal for each cycle of the command voltage is referred to as K, and the number K of the carrier pulses of the triangular carrier signal for each cycle of the command voltage can satisfy the following equation K=3*(2d+1) where d is an integer equal to or more than zero. The controller can be configured to change, in the single-pulse modulation, the number K of the carrier pulses of the triangular carrier signal for each cycle of the command voltage to a different number of a switched triangular carrier signal while the command voltage and the triangular carrier signal concurrently cross the zero level such that a change direction of the command voltage and a change direction of the triangular carrier signal are opposite to each other.

This ninth aspect can reliably prevent an occurrence of narrow-width pulses as drive pulses for the rotary electric machine; the narrow-width pulses each have a width narrower than a width of each of the single positive and negative pulses.

In a tenth exemplary aspect, the cyclic carrier signal is a triangular carrier signal, and the number of the carrier pulses of the triangular carrier signal for each cycle of the command voltage is referred to as K. The controller can be configured to change, in the single-pulse modulation, the number K of the carrier pulses of the triangular carrier signal for each cycle of the command voltage to an odd multiple of 3.

This tenth exemplary aspect makes it possible to switch the number K of the carrier pulses of the triangular carrier signal for each cycle of the command voltage to an odd multiple of 3 without checking the change direction of the command voltage and the change direction of the triangular carrier signal at each common zero cross point. This results in operations of the controller being more simply.

In an eleventh exemplary aspect, the cyclic carrier signal is a triangular carrier signal, and the number of the carrier pulses of the triangular carrier signal for each cycle of the command voltage is referred to as K. The controller is configured to determine, in the single-pulse modulation, whether the triangular carrier signal is increasing or decreasing at a point when the command voltage and the triangular carrier signal concurrently cross the zero level in accordance with the number K of the carrier pulses of the triangular carrier signal, the command voltage, and the phase of the command voltage relative to a reference phase.

This eleventh exemplary aspect enables the change direction of the command voltage and the change direction of the triangular carrier signal at each common zero cross point to be obtained based on the phase of the command voltage relative to the reference phase at the corresponding common zero cross point. This therefore makes it possible to determine the change direction of the command voltage and the change direction of the triangular carrier signal at each common zero cross point.

BRIEF DESCRIPTION OF THE DRAWINGS

Other aspects of the present disclosure will become apparent from the following description of embodiments with reference to the accompanying drawings in which:

FIG. 9A is a graph schematically illustrating an example of the relationship among the cyclic carrier signal, each three-phase command voltage, and the corresponding drive signal according to the fourth embodiment of the present disclosure;

FIG. 9B is a graph schematically illustrating an example of the relationship among a reversed cyclic carrier signal, each three-phase command voltage, and the corresponding drive signal according to the fourth embodiment;

FIG. 10A is a graph schematically illustrating an example of the relationship among a reversed cyclic carrier signal, each three-phase command voltage, and the corresponding drive signal according to the fifth embodiment of the present disclosure;

DETAILED DESCRIPTION OF EMBODIMENT

Figure 1:
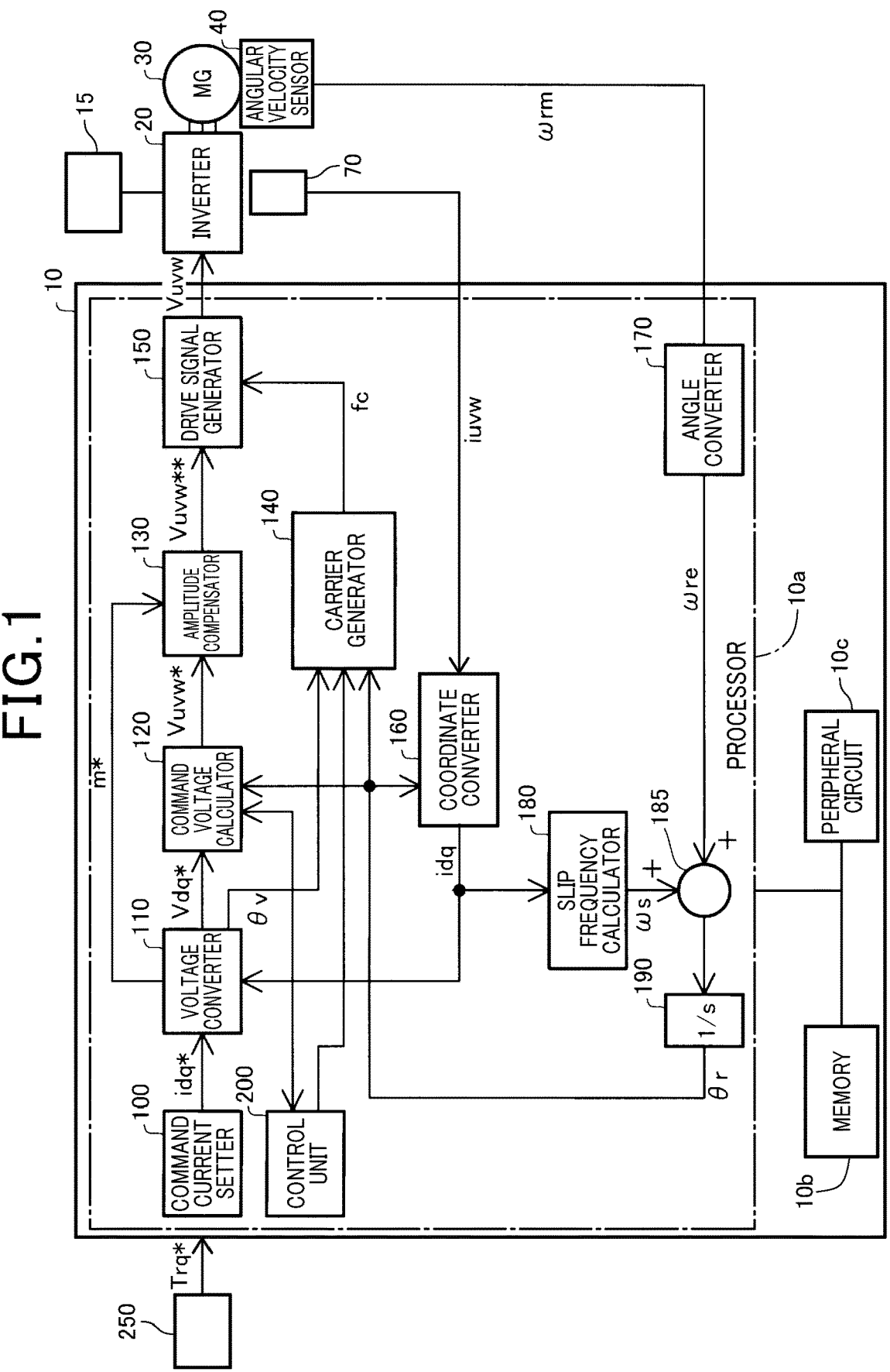
FIG. 1 is a block diagram schematically illustrating an overall configuration of a motor drive system according to the first embodiment of the present disclosure.

The following describes embodiments of the present disclosure with reference to the accompanying drawings. In the embodiments, like parts between the embodiments, to which like reference characters are assigned, are omitted or simplified in description to avoid redundant description.

First Embodiment

Referring to FIG. 1, there is illustrated a three-phase motor-generator as an example of rotary electric machines, referred to simply as a "motor-generator" 30, installed in, for example, a mobile vehicle, such as a hybrid vehicle or an electrical vehicle as its main engine according to the first embodiment. The motor-generator 30 is mechanically coupled to driving wheels (not shown) of the mobile vehicle.

FIG. 1 also illustrates a motor-generator drive system 100 including a motor-generator (MG) 30, a three-phase inverter 20, a direct-current (DC) power source 15, and a control apparatus 10 for controlling the inverter 20 to thereby control the motor-generator 30.

Figure 2:
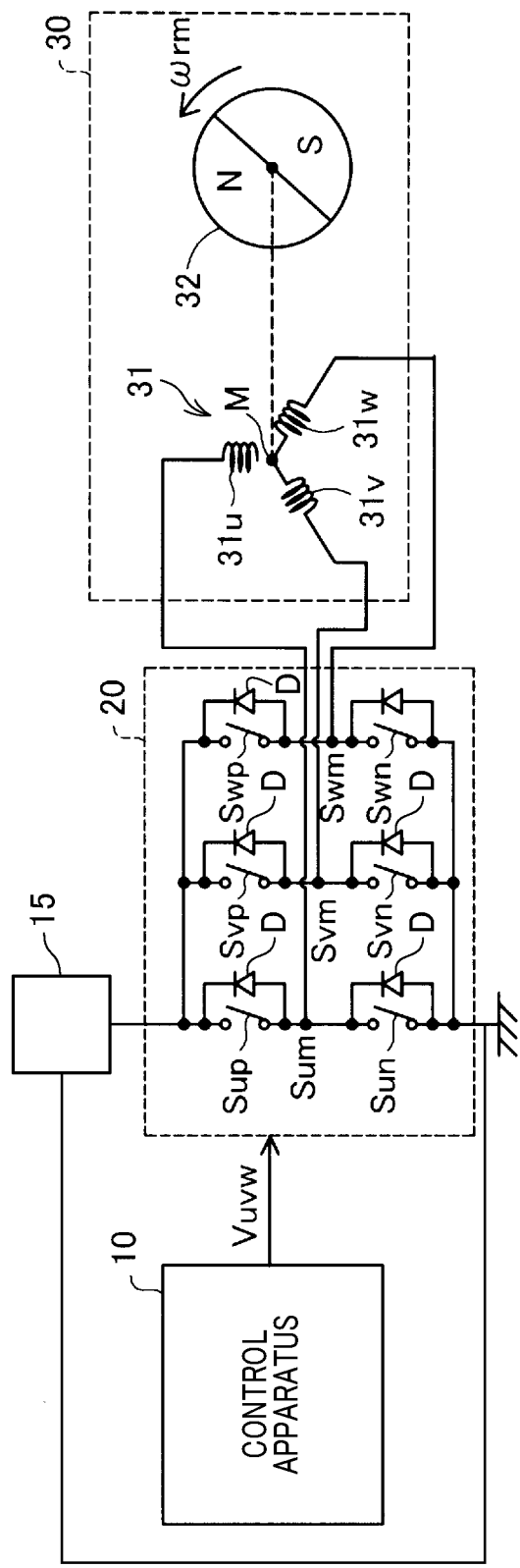
FIG. 2 is a circuit diagram schematically illustrating an example of the structure of each of a three-phase inverter and a motor-generator illustrated in FIG. 1.

As illustrated in FIG. 2, the motor-generator 30 is comprised of, for example, a rotor 32 including at least one magnet with N and S poles for generating a magnetic flux. In other words, the rotor 32 has a direct axis (d-axis) in line with a direction of the magnetic flux created by the N pole of the rotor 32. The rotor 32 also has a quadrature axis (q-axis) with a phase being $\pi/2$-radian electrical angle leading with respect to a corresponding d-axis during rotation of the rotor 32. In other words, the q-axis is electromagnetically perpendicular to the d-axis. The d and q axes constitute a d-q coordinate system, i.e. a two-phase rotating coordinate system, defined to the rotor 32.

The motor-generator 30 also includes a stator 31 including three-phase windings, i.e. U-, V-, and W-phase coils $31u$, $31v$, and $31w$. For example, the three-phase coils (U-, V-, and W-phase coils) $31u$, $31v$, and $31w$ each have a first end connected to a common junction (neutral point) M in, for example, a star-configuration. The first ends of the three-phase coils $31u$, $31v$, and $31w$ can be connected in a delta-configuration.

Specifically, the motor-generator 30, the DC power source 15 is electrically connected via the inverter 20. The control apparatus 10 is configured such that the inverter 20 converts DC power output from the DC power source 15 into three-phase alternating-current (AC) voltages, and supplies the three-phase AC voltages to the respective three-phase coils (U-, V-, and W-phase coils) $31u$, $31v$, and $31w$ of the motor-generator 30. This creates a rotating magnetic field. This enables the rotor 32 to turn based on magnetic attractive force between the rotating magnetic field and the magnetic field generated from the rotor 32.

Referring to FIG. 2, the inverter 20 includes three pairs of series-connected high- and low-side (upper- and lower-arm) switches Sup and Sun, Svp and Svn, and Swp and Swn. The inverter 20 also includes flyback diodes D electrically connected in antiparallel to the corresponding switches Sup and Sun, Svp and Svn, and Swp and Swn, respectively.

In the first embodiment, as each switching element S*# (*=u, v, w, #=p, n), a voltage-controlled semiconductor switching element, such as an IGBT, is used.

When power MOSFETs are used as the switches S*#(*=u, v, w, #=p, n), intrinsic diodes of the power MOSFETs can be used as the flyback diodes, thus eliminating the flywheel diodes.

The three pairs of switches are parallely connected to each other in bridge configuration. A connection node Sum through which the U-phase switches Sup and Sun are connected is connected to the second end of the U-phase coil 31u. Similarly, a connection node Svm through which the V-phase switches Svp and Svn are connected is connected to the second end of the V-phase coil 31v, and a connection node Swm through which the W-phase switches Swp and Swn are connected is connected to the second end of the W-phase coil 31w.

A first end of the series-connected switches of each of the three pairs, such as the collector of the corresponding upper-arm IGBT, is connected to a positive terminal of the DC power source 15 via a positive DC line. An opposite second end of the series-connected switches of each of the three pairs, such as the emitter of the corresponding lower-arm IGBT, is connected to a negative terminal of the DC power source 15 via a common signal ground.

Each switch S*# also has a control terminal connected to the control apparatus 10.

The motor-generator drive system 100 includes a current sensor 70 arranged to measure at least two of three-phase currents Iu, Iv, and Iw respectively flowing through the U-, V-, and W-phase coils 31u, 31v, and 31w. If the current sensor 70 is configured to measure two phase currents, such as V- and W-phase currents Iv and Iw flowing through the respective V- and W-phase coils 31v and 31w, the current sensor 70 or control apparatus 10 can be configured to calculate the remaining U-phase current Iu using Kirchhoff's law.

Then, the current sensor 70 is configured to output these measurements including at least two of the three-phase currents Iu, Iv, and Iw to the control apparatus 10.

The motor-generator drive system 100 also includes an angular velocity sensor 40. The angular velocity sensor 40 is configured to measure, i.e. monitor, a mechanical angular velocity, i.e. a mechanical angular frequency, corm of the rotor 32 of the motor-generator 10, and output the measurement of the mechanical angular frequency corm to the control apparatus 10.

The DC power source 15 outputs a DC input voltage Vdc to be input to the inverter 20, so that the control apparatus 10 obtains the DC input voltage Vdc input to the inverter 20.

The control apparatus 10 is designed as, for example, a microcomputer circuit that essentially includes, for example, a CPU, i.e. a processor, 10a, a memory 10b comprised of, for example, a RAM and a ROM, and a peripheral circuit 10c; the ROM is an example of a non-transitory storage medium. At least part of all functions provided by the control apparatus 10 can be implemented by at least one processor; the at least one processor can be comprised of (1) The combination of at least one programmable processing unit, i.e. at least one programmable logic circuit, and at least one memory (2) At least one hardwired logic circuit (3) At least one hardwired-logic and programmable-logic hybrid circuit Specifically, the control apparatus 10 is configured such that the CPU 10a performs instructions of programs stored in the memory 10b, thus performing predetermined software tasks associated with the mobile vehicle. The control apparatus 10 can also be configured such that the at least one special-purpose electronic circuit performs predetermined hardware tasks associated with the motor-generator 30. The control apparatus 10 can be configured to perform both the software tasks and the hardware tasks.

The control apparatus 10 functionally includes a command current setter 100, a voltage converter 110, a command voltage calculator 120, an amplitude compensator 130, a carrier generator 140, and a drive signal generator 150. The control apparatus 10 functionally includes a coordinate converter 160, an angle converter 170, a slip frequency calculator 180, an adder 185, an integrator 190, and a control unit 200. The control unit 200 and the drive signal generator 150 serve as a controller of the present disclosure.

An external electronic control unit (ECU) 250 installed in the mobile vehicle determines request torque Trq* based on, for example, a depressed quantity of an accelerator pedal of the mobile vehicle, and sends, to the control apparatus 10, the request torque Trq*.

The coordinate converter 160 is configured to (1) Sample the at least two phase currents Iv and Iw, (2) Calculate the U-phase current Iu based on the at least two phase currents Iv and Iw, (3) Convert the three-phase currents Iu, Iv and Iw into d- and q-axis currents Id and Iq using a magnetic flux phase θr described later and, for example, a known conversion equation or map information.

The conversion equation information or map information represents correlations between values of the three-phase currents Iu, Iv and Iw, values of the magnetic flux phase θr, and values of the d- and q-axis currents Id and Iq.

Thereafter, the coordinate converter 160 feeds the d- and q-axis currents Id and Iq back to the voltage converter 110 and the slip frequency calculator 180.

The command current setter 100 sets a command d-axis current Id* and a command q-axis current Iq* in the d-q coordinate system of the rotor 32 of the motor-generator 30 in accordance with the request torque Trq*. The command d-axis current Id* and command q-axis current Iq* are required to obtain torque of the motor-generator 30 matching with the request torque Trq*.

For example, the command current setter 100 may have a map in data-table format, in mathematical expression format, and/or program format. The map includes information indicative of a relationship between values of each of the d-axis command current Id* and the q-axis command current Iq*, and values of the request torque Trq*. Specifically, the command current setter 10 refers to the map, and extracts a value of each of the d-axis command current Id* and the q-axis command current Iq* corresponding to the input value of the request torque Trq*. Note that a d-axis current and a q-axis current will be simply described as d-q axis currents hereinafter.

The voltage converter 110 subtracts the d-axis current Id fed back from the coordinate converter 160 from the d-axis command current Id* to thereby calculate a d-axis current deviation ΔId. The voltage converter 110 also subtracts the q-axis current value Iq fed back from the coordinate converter 160 from the q-axis command current Iq* to thereby calculate a q-axis current deviation ΔIq.

Then, the voltage converter 110 performs, for example, a proportional-integral (PI) feedback operation using the d-axis current deviation ΔId as input data, and a proportional gain term and an integral gain term of a PI feedback control algorithm (PI algorithm). The PI feedback operation calculates a sinusoidal d-axis command voltage Vd* such that the d-axis current deviation ΔId converges to zero, thus causing the d-axis current Id to follow the d-axis command current Id*.

The voltage converter 110 performs, for example, a PI feedback operation using the q-axis current deviation ΔIq as input data, and a proportional gain term and an integral gain term of a PI feedback control algorithm (PI algorithm). The PI feedback operation calculates a sinusoidal q-axis command voltage Vq* such that the q-axis current deviation ΔIq converges to zero, thus causing the q-axis current Iq to follow the q-axis command current Iq*.

The voltage converter 110 also calculates, based on the d- and q-axis command voltages Vd* and Vq*, a voltage phase θv of a command voltage vector of the d- and q-axis command voltages Vd* and Vq* in the d-q coordinate system.

The voltage command converter 110 further calculates, based on the DC input voltage Vdc and the magnitude of the command voltage vector (Vd*, Vq*) in the d-q coordinate system, a modulation factor command m*. For example, the voltage command converter 110 calculates the modulation factor command m* in accordance with the following equation [1]:

$$m^* = 2\sqrt{\frac{2}{3}} \frac{Vr}{Vdc} \quad [1]$$

where Vr represents the magnitude of the command voltage vector (Vd*, Vq*).

To the command voltage calculator 120, the d- and q-axis command voltages Vd* and Vq* and the magnetic flux phase θr are input.

The command voltage calculator 120 converts the d- and q-axis command voltages Vd* and Vq* into three-phase command voltages Vu*, Vv*, and Vw* using the magnetic flux phase θr and, for example, map data or equation data under control of the control unit 200. The map data or equation data represents correlations between values of the three-phase command voltages Vu*, Vv*, and Vw*, values of the command d-axis voltage Vd* and command q-axis voltage Vq*, and values of the magnetic flux phase θr. Reference character Vuvw* can be assigned to the three-phase command voltages Vu*, Vv*, and Vw*.

The amplitude compensator 130 determines whether the inverter 20 is controlled in sinusoidal pulse-width modulation (PWM) in comparison PWM mode, or overmodulation PWM in the comparison PWM mode, or single-pulse modulation in the comparison PWM mode under control of the control unit 200 set forth above.

Upon determining that the inverter 20 is controlled in the sinusoidal PWM, the amplitude compensator 130 outputs, to the drive signal generator 150, the three-phase command voltages Vuvw* unchanged as three-phase command voltages Vu, Vv, and Vw. Reference character Vuvw can be assigned to the three-phase command voltages Vu, Vv, and Vw**.

Upon determining that the inverter 20 is controlled in the overmodulation PWM, the amplitude compensator 130 increases the amplitude of each of the three-phase command voltages Vuvw* based on the modulation factor command m* to thereby compensate for the amplitude of each of the three-phase command voltages Vuvw*. Then, the amplitude compensator 130 outputs, to the drive signal generator 150, the amplitude-compensated three-phase command voltages Vuvw* as three-phase command voltages Vuvw**.

Similarly, upon determining that the inverter 20 is controlled in the single-pulse modulation, the amplitude compensator 130 increases the amplitude of each of the three-phase command voltages Vuvw* based on the modulation factor command m* to thereby compensate for the amplitude of each of the three-phase command voltages Vuvw*. Then, the amplitude compensator 130 outputs, to the drive signal generator 150, the amplitude-compensated three-phase command voltages Vuvw* as three-phase command voltages Vuvw**.

The carrier generator 140 generates a cyclic carrier signal fc, in particular, a cyclic triangular carrier signal fc, in accordance with the voltage phase θv and the magnetic flux phase θr under control of the control unit 200 such that (1) The cyclic carrier signal fc has a phase synchronized with the rotating magnetic field generated by the three-phase coils 31u, 31v, and 31w of the motor-generator 30

(2) The cyclic carrier signal fc has a predetermined number of carrier pulses, i.e. triangular carrier pulses, for one cycle, i.e. an electrical angle 2π, of each of the three-phase command voltages Vuvw*

(3) The cyclic carrier signal fc has a voltage Vfc within the range from an upper peak VH corresponding to (Vdc/2), and a lower peak VL corresponding to (−Vdc/2)

In particular, the predetermined number of triangular carrier pulses of the cyclic carrier signal fc for one cycle, i.e. the electrical angle 2π, of each of the three-phase command voltages Vuvw*, which is referred to as K, is set to satisfy the following equation [2]:

$$K = 3*(2d+1) \quad [2]$$

where d is an integer equal to or more than 0.

Hereinafter, the predetermined number K of triangular carrier pulses of the cyclic triangular carrier signal fc for one cycle (electrical angle 2π) of each of the three-phase command voltages Vuvw* will be simply referred to as a pulse number K of the cyclic carrier signal fc. For example, the pulse number K of the cyclic carrier signal fc can be set to 3, 9, 15, or 21. The pulse number K of the cyclic carrier signal fc is preferably set to a value as large as possible, because the larger the pulse number K of the cyclic carrier signal fc is, the more smoothly the rotor 32 of the motor-generator 30 is turned.

If the pulse number K of the cyclic carrier signal fc is set to an excessively high value with the rotational speed of the rotor 32 of the motor-generator 30 being higher than a predetermined threshold, the frequency of the cyclic carrier signal fc may become higher than an upper limit frequency of the cyclic carrier signal fc. The upper limit frequency of the cyclic carrier signal fc represents an upper limit frequency that can be generated by the carrier generator 140.

For this reason, the control unit 200 is configured to cause the carrier generator 140 to generate the cyclic carrier signal fc whose pulse number K decreases as the rotational speed of the rotor 32 of the motor-generator 30 increases. This configuration prevents the frequency of the cyclic carrier signal fc from exceeding the upper limit frequency.

The drive signal generator 150 compares the voltage Vfc of the cyclic carrier signal fc with each of the three-phase command voltages Vuvw** to thereby generate (1) A U-phase drive signal, i.e. a switching pulse signal, Vu for the U-phase upper-arm switch Sup (2) A V-phase drive signal, i.e. a switching pulse signal, Vv for the V-phase upper-arm switch Svp (3) A W-phase drive signal, i.e. a switching pulse signal, Vw for the W-phase upper-arm switch Swp Reference character Vuvw can be assigned to the three-phase drive signals Vu, Vv, and Vw.

The detailed operations of the drive signal generator 150 will be described later.

The angle converter 170 converts the mechanical angular frequency ωrm of the motor-generator 30 measured by the angular velocity sensor 40 into an electrical angular frequency ωre of the motor-generator 30.

The slip frequency calculator 180 converts the d- and q-axis currents Id and Iq into a slip angular frequency ωs using, for example, a known conversion equation or map information. The conversion equation information or map information represents correlations between values of the d- and q-axis currents Id and Iq and values of the slip angular frequency ωs. The adder 185 adds the slip angular frequency ωs and the electrical angular frequency ωre to each other to thereby calculate the sum of the slip angular frequency ωs and the electrical angular frequency ωre. The integrator 190 integrates the sum of the slip angular frequency ωs and the electrical angular frequency ωre to thereby calculate the magnetic flux phase θr, i.e. the phase of the rotating magnetic field.

The control unit 200 is configured to control each of the functional modules 100 to 190, in particular, the command voltage calculator 120 and the carrier generator 140.

Figure 3:
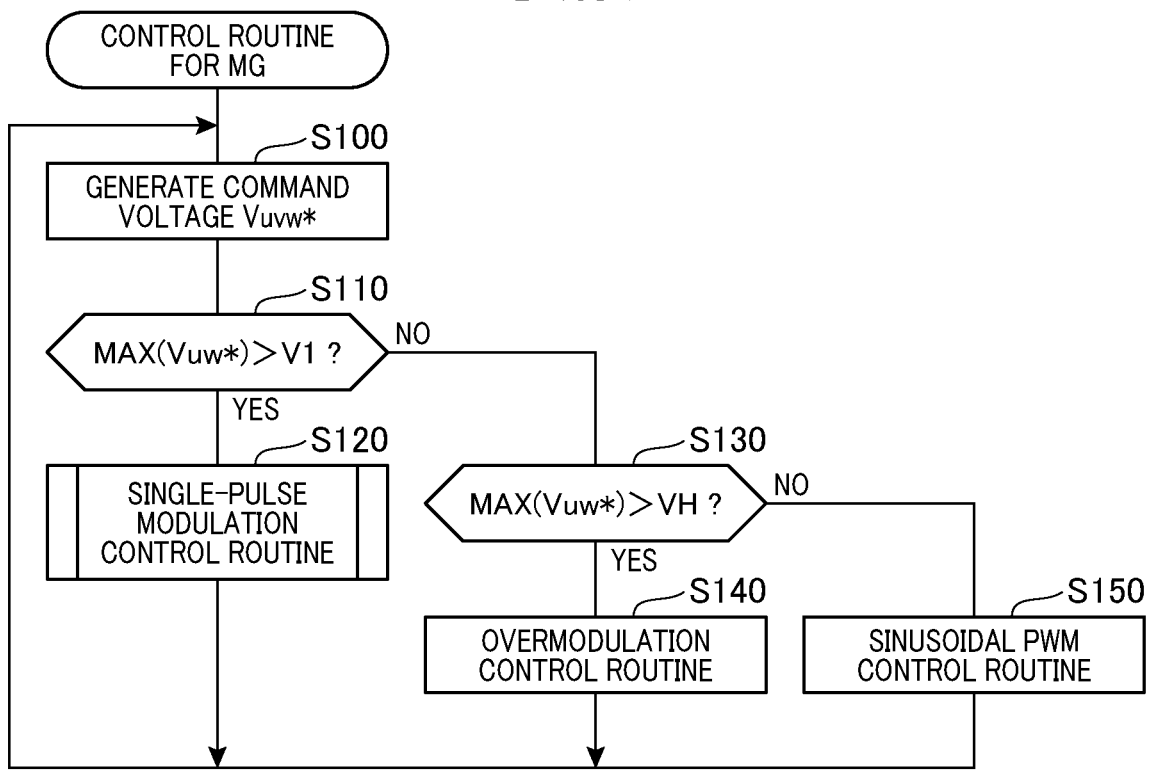
FIG. 3 is a flowchart schematically illustrating an example of a control routine carried out by a control unit illustrated in FIG. 1.

The following describes a control routine for the motor-generator 30 carried out by the control unit 200 every predetermined control period with reference to FIG. 3.

When starting the control routine, the control unit 200 causes the command current setter 100, the voltage converter 110, and the command voltage calculator 120 to generate the three-phase command voltages Vuvw* that match with the request torque Trq* in step S100.

Next, the control unit 200 determines whether the amplitude of each of the three-phase command voltages Vuvw*, which will be referred to as MAX(Vuvw*), is equal to or higher than a predetermined threshold voltage V1 in step S110. Note that the threshold voltage V1 is set to be higher than the upper peak VH of the cyclic carrier signal fc. For example, when each of the three-phase command voltages Vuvw* is continuously higher than the upper peak VH of the cyclic carrier signal fc for the electrical angle π, the control unit 200 can determine the maximum value of each of the three-phase command voltages Vuvw* as the threshold voltage V1. The control unit 200 can determine the threshold voltage V1 in accordance with the modulation factor command m*, or the threshold voltage V1 can be previously determined in experiments.

Upon determining that the amplitude MAX(Vuvw*) of each of the three-phase command voltages Vuvw* is equal to or higher than the threshold voltage V1 (YES in step S110), the control unit 200 performs a single-pulse modulation control routine that controls the inverter 20 in the single-pulse modulation in step S120 described in detail later.

Otherwise, upon it being determined that the amplitude MAX(Vuvw*) of each of the three-phase command voltages Vuvw* is lower than the threshold voltage V1 (NO in step S110), the control routine proceeds to step S130. Then, the control unit 200 determines whether the amplitude MAX(Vuvw*) of each of the three-phase command voltages Vuvw* is equal to or higher than the upper peak VH of the cyclic carrier signal fc in step S130.

Upon it being determined that the amplitude MAX(Vuvw*) of each of the three-phase command voltages Vuvw* is equal to or higher than the upper peak VH of the cyclic carrier signal fc (YES in step S130), the control routine proceeds to step S140. In step S140, the control unit 200 causes the drive signal generator 150 to perform an overmodulation control routine that controls the inverter 20 in the overmodulation PWM.

Otherwise, upon it being determined that the amplitude MAX(Vuvw*) of each of the three-phase command voltages Vuvw* is lower than the upper peak VH of the cyclic carrier signal fc (NO in step S130), the control routine proceeds to step S150. In step S150, the control unit 200 causes the drive signal generator 150 to perform a sinusoidal PWM control routine that controls the inverter 20 in the sinusoidal PWM.

Figure 4:
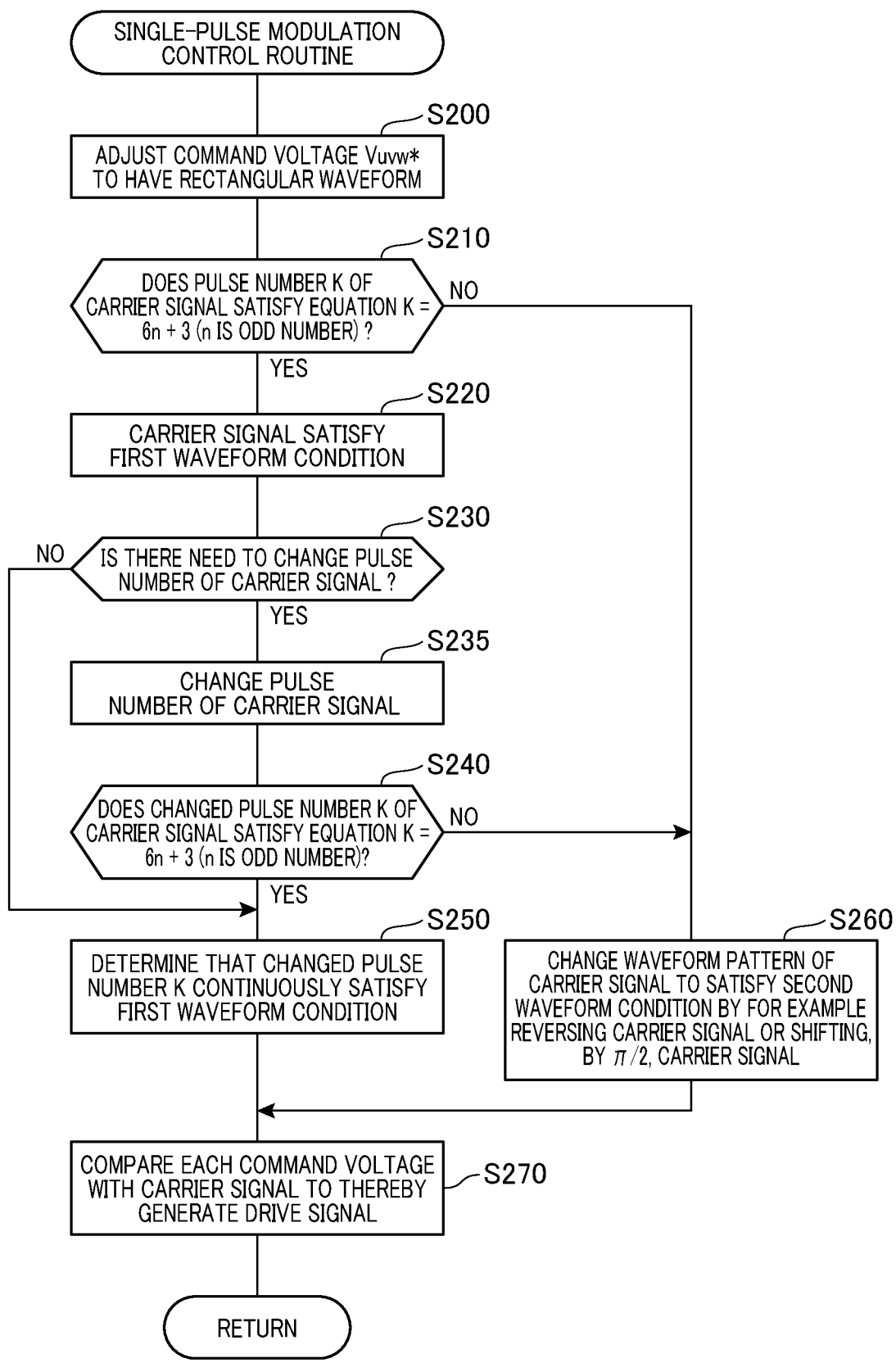
FIG. 4 is a flowchart schematically illustrating a single-pulse modulation control routine carried out by the control unit in step S120 of FIG. 3.

FIG. 4 schematically illustrates the single-pulse modulation control routine carried out by the control unit 200 in step S120.

Figure 6:
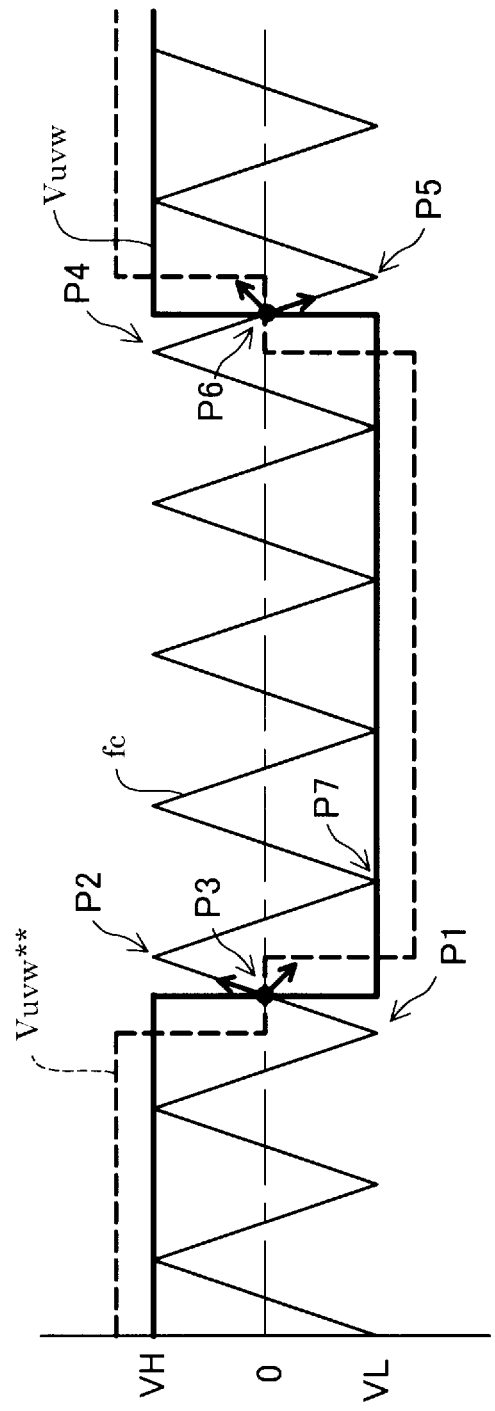
FIG. 6 is a graph schematically illustrating how the control unit performs single-pulse modulation.

When starting the single-pulse modulation control routine, the control unit 200 adjusts each of the three-phase command voltages Vuvw* such that the corresponding one of the three-phase command voltages Vuvw* has a rectangular waveform having (1) A single positive pulse, a predetermined zero duration matching with, for example, the half cycle of the cyclic carrier signal fc, and a single negative pulse, whose duration is the same as the positive pulse, during one cycle thereof corresponding 2π electrical degrees (2) A predetermined upper limit, i.e. positive peak amplitude, of the positive pulse set to be higher than the upper peak VH of the cyclic carrier signal fc (see FIG. 6 described later)

(3) A predetermined lower limit, i.e. negative peak amplitude, of the negative pulse set to be lower than the lower peak VL of the cyclic carrier signal fc (see FIG. 6 described later) in step S200

As described above, the drive signal generator 150 compares the voltage Vfc of the cyclic carrier signal fc with each of the three-phase command voltages Vuvw to thereby generate the drive signals Vu, Vv, and Vw to be applied to the respective three-phase upper-arm switches. For example, when the voltage Vfc of the cyclic carrier signal fc is higher than the U-phase command voltage Vu, the drive signal generator 150 generates a negative OFF pulse as the drive signal Vu for the U-phase upper-arm switch Sup. In contrast, when the voltage Vfc of the cyclic carrier signal fc is lower than the U-phase command voltage Vu**, the drive signal generator 150 generates the ON pulse as the drive signal Vu for the U-phase upper-arm switch Sup.

While the amplitude of each of the three-phase command voltages Vuvw is higher than the voltage Vfc of the cyclic carrier signal fc, the drive signal generator 150 generates the constant drive signals Vuvw for the respective three-phase upper-arm switches independently of an increase of the amplitude of the corresponding one of the three-phase command voltages Vuvw. Similarly, while the amplitude of each of the three-phase command voltages Vuvw is lower than the voltage Vfc of the cyclic carrier signal fc, the drive signal generator 150 generates the constant drive signals Vuvw for the respective three-phase upper-arm switches independently of a decrease of the amplitude of the corresponding one of the three-phase command voltages Vuvw.

From this viewpoint, the control unit 200 adjusts each of the three-phase command voltages Vuvw* such that the corresponding one of the three-phase command voltages Vuvw* has (1) The positive pulse, the predetermined zero duration, and the negative pulse, whose duration is the same as the positive pulse, during one cycle thereof corresponding 2π electrical degrees (2) The predetermined upper limit, i.e. positive peak amplitude, of the positive pulse set to be higher than the upper peak VH of the cyclic carrier signal fc (see FIG. 6 described later)

(3) The predetermined lower limit, i.e. negative peak amplitude, of the negative pulse set to be lower than the lower peak VL of the cyclic carrier signal fc (see FIG. 6 described later)

Adjusting each of the three-phase command voltages Vuvw* to have the set of positive and negative pulses during each cycle prevents the amplitude of each of the three-phase command voltages Vuvw* from excessively increasing or excessively decreasing.

As described above, the control unit 200 has a function of adjusting the pulse number K of the cyclic carrier signal fc depending on the rotational speed of the motor-generator 30 as long as the adjusted pulse number K of the cyclic carrier signal fc satisfies the equation [2].

Following the operation in step S200, the control unit 200 determines whether a current value of the pulse number K of the cyclic carrier signal fc satisfies the following equation [3] in step S210:

$$K = 6n+3 \quad [3]$$

where n is an odd number.

Upon it being determined that the current value of the pulse number K of the cyclic carrier signal fc satisfies the equation [3] (YES in step S210), the single-pulse modulation control routine proceeds to step S220. In step S220, the control unit 200 determines that the current waveform of the cyclic carrier signal fc, which has the pulse number K equal to (6n+3), satisfies a first waveform condition in step S220. Then, the single-pulse modulation control routine proceeds to step S230.

The first waveform condition for the cyclic carrier signal fc is defined such that (1) A selected lower peak VL of the cyclic carrier signal fc synchronizes with a predetermined reference phase of zero of each of the three-phase command voltages Vuvw*

(2) A selected upper peak VH of the cyclic carrier signal fc synchronizes with the phase π of the corresponding one of the three-phase command voltages Vuvw*

Note that the center of a selected positive pulse of each of the three-phase command voltages Vuvw* is defined as the reference phase zero of the corresponding one of the three-phase command voltages Vuvw*.

Additionally, the first waveform condition for the cyclic carrier signal fc has a feature that (1) A selected lower peak VL of the cyclic carrier signal fc synchronizes with the falling edge of a corresponding positive pulse of each of the three-phase command voltages Vuvw*

(2) A selected upper peak of the cyclic carrier signal fc synchronizes with the rising edge of a corresponding negative pulse of each of the three-phase command voltages Vuvw*

Otherwise, upon it being determined that the current value of the pulse number K of the cyclic carrier signal fc satisfies the equation [2], but does not satisfy the equation [3] (NO in step S210), the single-pulse modulation control routine proceeds to step S260. Note that the control unit 200 can be configured to skip the determination in step S210.

In step S230, the control unit 200 determines whether there is a need to change or switch the pulse number K of the cyclic carrier signal fc to a different number depending on the rotational speed of the motor-generator 30.

Upon it being determined that there is a need to change or switch the pulse number K of the cyclic carrier signal fc depending on the rotational speed of the motor-generator 30 (YES in step S230), the single-pulse modulation control routine proceeds to step S235. Otherwise, there is no need to change or switch the pulse number K of the cyclic carrier signal fc depending on the rotational speed of the motor-generator 30 (NO in step S230), the single-pulse modulation control routine proceeds to step S250.

In step S235, the control unit 200 changes or switches the pulse number K of the cyclic carrier signal fc to a different number due to, for example, a considerable change of the rotational speed of the motor-generator 30 as long as the changed pulse number K of the cyclic carrier signal fc satisfies the equation [2]. After the operation in step S235, the single-pulse modulation control routine proceeds to step S240.

In step S240, the control unit 200 determines whether the current value, i.e. changed value, of the pulse number K of the cyclic carrier signal fc, which has been changed in step S230, satisfies the above equation [3].

Upon it being determined that the current value of the pulse number K of the cyclic carrier signal fc satisfies the equation [3] (YES in step S240), the single-pulse modulation control routine proceeds to step S250.

That is, the affirmative determination in step S240 enables the control unit 200 to recognize that the absolute value of the difference between the current value, i.e. the changed value, of the pulse number K of the cyclic carrier signal fc and the immediately previous value of the pulse number K of the cyclic carrier signal fc is a natural-number multiple of 12.

In step S250, the control unit 200 determines that the current waveform pattern of the cyclic carrier signal fc, which has the pulse number K equal to (6n+3), continuously satisfies the first waveform condition for the cyclic carrier signal fc. Thereafter, the control unit 200 terminates the single-pulse modulation control routine.

Otherwise, upon it being determined that the current value of the pulse number K of the cyclic carrier signal fc does not satisfy the equation [3] (NO in step S240), the single-pulse modulation control routine proceeds to step S260.

That is, the negative determination in step S240 enables the control unit 200 to recognize that the absolute value of the difference between the changed current value of the pulse number K of the cyclic carrier signal fc and the immediately previous value of the pulse number K of the cyclic carrier signal fc is (1) A natural-number multiple of 6
(2) Not a natural-number multiple of 12

In step S260, the control unit 200 changes the current waveform pattern of the cyclic carrier signal fc, which does not have the pulse number K equal to (6n+3), such that the changed waveform pattern satisfies a second waveform condition for the cyclic carrier signal fc.

For example, the control unit 200 reverses the polarity of the current waveform pattern of the cyclic carrier signal fc to thereby satisfy the second waveform condition for the cyclic carrier signal fc. Alternatively, the control unit 200 shifts the current waveform pattern of the cyclic carrier signal fc by the half cycle, i.e. π electrical degrees, of the cyclic carrier signal fc in its forward direction or backward direction to thereby satisfy the second waveform condition for the cyclic carrier signal fc.

The second waveform condition for the cyclic carrier signal fc is defined such that (1) A selected upper peak VH of the cyclic carrier signal fc synchronizes with the predetermined reference phase zero of each of the three-phase command voltages Vuvw*

(2) A selected lower peak VL of the cyclic carrier signal fc synchronizes with the phase π of the corresponding one of the three-phase command voltages Vuvw*

Additionally, the second waveform condition for the cyclic carrier signal fc has the feature, which is the same as the feature of the first waveform condition, that (1) A selected lower peak VL of the cyclic carrier signal fc synchronizes with the falling edge of a corresponding positive pulse of each of the three-phase command voltages Vuvw*

(2) A selected upper peak VH of the cyclic carrier signal fc synchronizes with the rising edge of a corresponding negative pulse of each of the three-phase command voltages Vuvw*

The detailed information about the second waveform condition will be described in, for example, the fourth embodiment described later.

Figure 5:
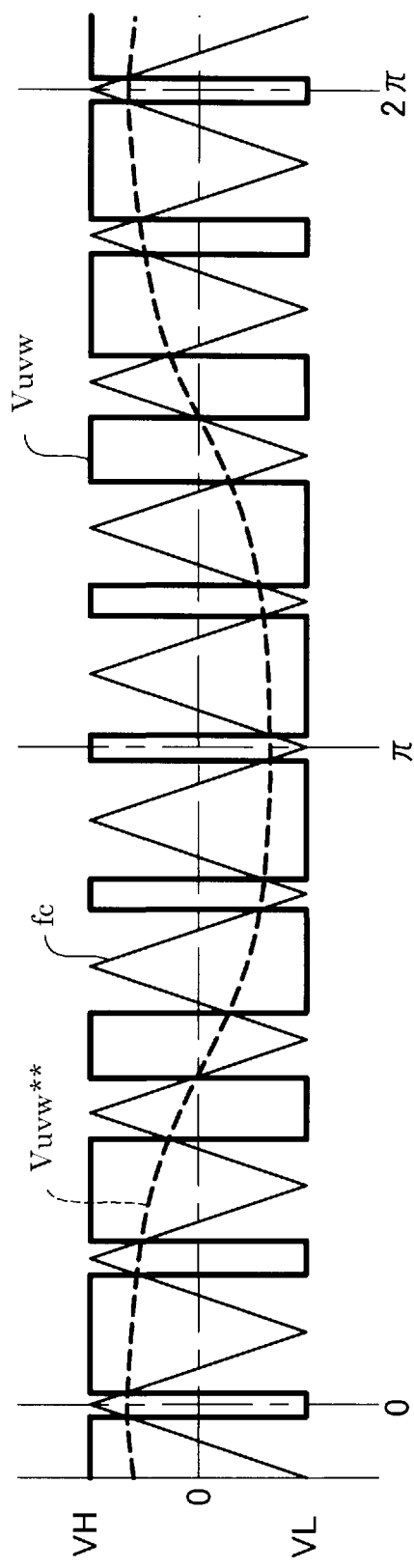
FIG. 5 is a graph schematically illustrating how the control unit performs sinusoidal PWM.

Following the operation in step S250 or S260, the controller 20 causes the drive signal generator 150 to compare the voltage Vfc of the cyclic carrier signal fc satisfying the first or second waveform condition with each of the three-phase command voltages Vuvw** in step S270 to thereby generate (1) The U-phase drive signal Vu for the U-phase upper-arm switch Sup (2) The V-phase drive signal Vv for the V-phase upper-arm switch Svp (3) The W-phase drive signal Vw for the W-phase upper-arm switch Swp Before describing the operation in step S270, the following describes the operation in step S150 first with reference to FIG. 5.

As described above, the control unit 200 causes the drive signal generator 150 to perform the sinusoidal PWM control routine that controls the inverter 20 in the sinusoidal PWM in step S150. In the sinusoidal PWM control routine, the drive signal generator 150 uses, as the three-phase command voltages Vuvw, three-phase command voltages Vuvw each having a sinusoidal waveform. As illustrated in FIG. 5, the upper peak amplitude of each of the sinusoidal three-phase command voltages Vuvw is set to be lower than the upper peak VH of the cyclic carrier signal fc (see step S130). Similarly, the lower peak amplitude of each of the sinusoidal three-phase command voltages Vuvw is set to be lower than the lower peak VL of the cyclic carrier signal fc (see step S130).

Specifically, while the amplitude of each of the three-phase command voltages Vuvw** is higher than the voltage Vfc of the cyclic carrier signal fc, the drive signal generator 150 generates the ON pulse as the corresponding one of the drive signals Vu, Vv, and Vw for the corresponding upper-arm switch, and individually applies the ON pulse to each of the upper-arm switches Sup, Svp, and Swp. This individually turns on each of the upper-arm switches Sup, Svp, and Swp while maintaining the corresponding one of the lower-arm switches Sun, Svn, and Swn in the off state.

In contrast, while the amplitude of each of the three-phase command voltages Vuvw** is lower than the voltage Vfc of the cyclic carrier signal fc, the drive signal generator 150 generates the OFF pulse as the corresponding one of the drive signals Vu, Vv, and Vw for the corresponding upper-arm switch, and individually applies the OFF pulse to each of the lower-arm switches Sun, Svn, and Swn. This individually turns on each of the lower-arm switches Sun, Svn, and Swn while maintaining the corresponding one of the upper-arm switches Sup, Svp, and Swp in the off state.

That is, the drive signal generator 150 complementarily turns on upper- and lower-arm switching elements of each pair while dead times during which the upper- and lower-arm switching elements of each pair are simultaneously turned off are ensured. For example, while the U-phase upper-arm switch Sup is in the on state, one of the V- or W-phase lower-arm switch Svn or Swn is in the off state.

Specifically, as illustrated in FIG. 5, the drive signal generator 150 generates (1) The U-phase drive signal Vu including the ON and OFF pulses whose number matches with the pulse number K of the cyclic carrier signal fc during one cycle (2π electrical degrees) of the U-phase command voltage Vu**

(2) The V-phase drive signal Vv including the ON and OFF pulses whose number matches with the pulse number K of the cyclic carrier signal fc during one cycle (2π electrical degrees) of the V-phase command voltage Vv**

(3) The W-phase drive signal Vw including the ON and OFF pulses whose number matches with the pulse number K of the cyclic carrier signal fc during one cycle (2π electrical degrees) of the W-phase command voltage Vw**

In the overmodulation PWM, like the sinusoidal PWM, the drive signal generator 150 uses the sinusoidal three-phase command voltages Vuvw each with the amplitude higher than the upper peak VH, i.e. the amplitude, of the cyclic carrier signal fc. In particular, the signal generator 150 is capable of performing a voltage-amplitude correction that distorts each of the three-phase sinusoidal command voltages Vu, Vv, and Vw from a corresponding original sinusoidal waveform.

The following describes the operation in step S270 with reference to FIG. 6.

As described above, in the single-pulse modulation, the drive signal generator 150 uses the cyclic carrier signal fc satisfying the first or second waveform condition, and each of the three-phase command voltages Vuvw* has, during one cycle thereof corresponding 2π electrical degrees, (1) The positive pulse with the peak amplitude set to be higher than the upper peak VH of the cyclic carrier signal fc (2) The predetermined zero duration (3) The negative pulse, whose duration is the same as the positive pulse, with the negative peak amplitude set to be lower than the lower peak VL of the cyclic carrier signal fc Like the sinusoidal PWM, while the amplitude of each of the three-phase command voltages Vuvw** is higher than the voltage Vfc of the cyclic carrier signal fc, the drive signal generator 150 generates the ON pulse as the corresponding one of the drive signals Vu, Vv, and Vw for the corresponding upper-arm switch.

In contrast, while the amplitude of each of the three-phase command voltages Vuvw** is lower than the voltage Vfc of the cyclic carrier signal fc, the drive signal generator 150 generates the OFF pulse as the corresponding one of the drive signals Vu, Vv, and Vw for the corresponding upper-arm switch.

In particular, FIG. 6 illustrates that the cyclic carrier signal fc satisfies the first waveform condition, so that a selected lower peak VL of the cyclic carrier signal fc synchronizes with the falling edge of a corresponding positive pulse of each of the three-phase command voltages Vuvw (see point P1). This means that the amplitude of each of the three-phase command voltages Vuvw is higher than the upper peak VH of the cyclic carrier signal fc before the phase of the cyclic carrier signal fc reaches the lower peak VL at the point P1. Note that a phase of any signal represents a phase thereof in electrical degrees, i.e. an electrical angular phase, without any special notice.

This enables each of the three-phase command voltages Vuvw to be zero between the phase of the cyclic carrier signal fc located at the lower peak at the point P1 and the phase of the cyclic carrier signal fc located at an adjacent upper peak at point P2. This therefore enables each of the three-phase command voltages Vuvw to cross the cyclic carrier signal fc at point P3 between the points P1 and P2. Because each of the three-phase command voltages Vuvw is zero between the points P1 and P2, so that each of the three-phase command voltages Vuvw at the point P3 is zero, and the voltage Vfc of the cyclic carrier signal fc at the point P3 is also zero. This enables each of the three-phase command voltages Vuvw** and the cyclic carrier signal fc to synchronously cross the zero level at the same point P3.

That is, the control unit 200 causes a selected lower peak VL of the cyclic carrier signal fc to synchronize with the falling edge of a corresponding positive pulse of each of the three-phase command voltages Vuvw (see point P1). This enables each of the three-phase command voltages Vuvw to be zero between the phase of the cyclic carrier signal fc located at the lower peak at the point P1 and the phase of the cyclic carrier signal fc located at the adjacent upper peak at the point P2. This therefore enables, at the same point P3 at which each of the three-phase command voltages Vuvw crosses the cyclic carrier signal fc, the corresponding phase command voltage Vuvw and the cyclic carrier signal fc to become zero. This results in common zero crossing of each of the three-phase command voltages Vuvw and the cyclic carrier signal fc being carried out. Note that the amplitude of each of the three-phase command voltages Vuvw is lower than the lower peak VL of the cyclic carrier signal fc when the phase of the cyclic carrier signal fc is located at the lower peak VL at point P2.

The first waveform condition is also defined such that a selected upper peak VH of the cyclic carrier signal fc synchronizes with the rising edge of a corresponding negative pulse of each of the three-phase command voltages Vuvw (see point P4). This means that the amplitude of each three-phase command voltage Vuvw is lower than the lower peak VL of the cyclic carrier signal fc between the phase of the cyclic carrier signal fc located at the upper peak at the point P2 and the phase of the cyclic carrier signal fc located at the upper peak at the point P4.

This therefore enables each of the three-phase command voltages Vuvw to be zero between the phase of the cyclic carrier signal fc located at the upper peak at the point P4 and the phase of the cyclic carrier signal fc located at an adjacent lower peak at point P5. This results in each of the three-phase command voltages Vuvw crossing the cyclic carrier signal fc at point P6 between the points P4 and P5. Because each of the three-phase command voltages Vuvw is zero between the points P4 and P5, so that each of the three-phase command voltages Vuvw at the point P6 is zero, and the voltage Vfc of the cyclic carrier signal fc at the point P6 is also zero. This enables each of the three-phase command voltages Vuvw** and the cyclic carrier signal fc concurrently cross the zero level at the same point P6.

That is, the control unit 200 causes a selected upper peak VH of the cyclic carrier signal fc to synchronize with the rising edge of a corresponding positive pulse of each of the three-phase command voltages Vuvw (see point P4). This enables each of the three-phase command voltages Vuvw to be zero between the phase of the cyclic carrier signal fc located at the upper peak at the point P4 and the phase of the cyclic carrier signal fc located at the adjacent lower peak at the point P5. This therefore enables, at the same point P6 at which each of the three-phase command voltages Vuvw crosses the cyclic carrier signal fc, the corresponding phase command voltage Vuvw and the cyclic carrier signal fc to become zero. This results in common zero crossing of each of the three-phase command voltages Vuvw and the cyclic carrier signal fc being carried out. Note that the amplitude of each of the three-phase command voltages Vuvw is higher than the upper peak VH of the cyclic carrier signal fc when the phase of the cyclic carrier signal fc is located at the lower peak VL at the point P5.

Because the amplitude of each three-phase command voltage Vuvw is higher than the upper peak VH of the cyclic carrier signal fc before the phase of the cyclic carrier signal fc reaches the zero-cross point P3, the operation in step S270 enables the ON pulse to be generated for each upper-arm switch. In contrast, the amplitude of each three-phase command voltage Vuvw is lower than the lower peak VL of the cyclic carrier signal fc between the phase of the cyclic carrier signal fc at the zero-cross point P3 and the phase of the cyclic carrier signal fc at the next zero-cross point P6. For this reason, the operation in step S270 enables the OFF pulse to be generated for each upper-arm switch. In addition, Because the amplitude of each three-phase command voltage Vuvw** is higher than the upper peak VH of the cyclic carrier signal fc after the phase of the cyclic carrier signal fc at the zero-cross point P6, the operation in step S270 enables the ON pulse to be generated for each upper-arm switch.

The phase difference of the cyclic carrier signal fc between the zero-cross point P3 and the next zero-cross point P6 corresponds to the half cycle, i.e. π electrical degrees, of each three-phase command voltage Vuvw. From those described above, the phase difference of the cyclic carrier signal fc between the zero-cross point P6 and an unillustrated next zero-cross point also corresponds to the half cycle, i.e. π electrical degrees, of each three-phase command voltage Vuvw.

That is, the single-pulse control routine carried out by the control apparatus 10 is configured to cause each three-phase command voltage Vuvw and the cyclic carrier signal fc to cross the zero level together at each of the points P3 and P6. This configuration makes it possible to alternatively create (1) The first state in which the amplitude of each three-phase command voltage Vuvw is higher than the upper peak VH of the cyclic carrier signal fc for the half cycle (π electrical degrees) of the corresponding phase command voltage Vuvw**

(2) The second state in which the amplitude of each three-phase command voltage Vuvw is lower than the upper peak VH of the cyclic carrier signal fc for the half cycle (π electrical degrees) of the corresponding phase command voltage Vuvw

In particular, this configuration also makes it possible to continuously generate, during every cycle (2π electrical degrees) of each three-phase command voltage Vuvw**, a single ON pulse and a single OFF pulse as the corresponding one of the drive signals Vu, Vv, and Vw.

As described above, the control apparatus 10 according to the first embodiment is configured to perform the comparison PWM mode including both (1) The sinusoidal PWM, which includes the overmodulation PWM, and compares the voltage Vfc of the cyclic carrier signal fc with the amplitude of each of the three-phase command voltages Vuvw** to thereby generate the corresponding one of the drive signals Vuvw to be applied to the corresponding one of the three-phase upper-arm switches (2) The single-pulse modulation The single-pulse modulation generates each three-phase command voltage Vuvw* such that the corresponding phase command voltage Vuvw* has 1. The positive pulse, the predetermined zero duration, and the negative pulse, whose duration is the same as the positive pulse, during one cycle thereof corresponding to $2\pi$ electrical degrees 2. The positive peak amplitude of the positive pulse set to be higher than the upper peak VH of the cyclic carrier signal fc 3. The negative peak amplitude of the negative pulse set to be lower than the lower peak VL of the cyclic carrier signal fc That is, the control apparatus 10 enables both the sinusoidal PWM including the overmodulation PWM and the single-pulse modulation to be carried out using the cyclic carrier signal fc without switching the modulation mode of the control apparatus 10 between sinusoidal PWM mode and single-pulse modulation mode.

In addition, the control apparatus 10 according to the first embodiment is configured to switch, for one cycle of each three-phase command voltage Vuvw*, one of the upper and lower limits of the corresponding phase command voltage Vuvw* to the other thereof during a phase interval between a selected pair (see the pair of points P1 and P2 or the pair of P4 and P5) of adjacent positive and negative peaks of the cyclic carrier signal fc in the single-pulse modulation.

This results in each three-phase command voltage Vuvw* and the cyclic carrier signal fc crossing the zero level at each point (see P3 and P6) for one cycle of the corresponding phase command voltage Vuvw*. This therefore prevents unnecessary switching operations of the switches of the inverter 20.

Note that the control apparatus 10 can be configured to switch, for one cycle of each three-phase command voltage Vuvw*, one of the upper and lower limits of the corresponding phase command voltage Vuvw* to the other thereof during a phase interval between a selected one of positive and negative peaks, such as the point P1 or P2, and the next negative peak, such as the point P7, of the cyclic carrier signal fc. This modified configuration also enables both the sinusoidal PWM and the single-pulse modulation using the cyclic carrier signal fc to be carried out without switching the modulation mode of the control apparatus 10 between the sinusoidal PWM mode and the single-pulse modulation mode.

The control apparatus 10 of the first embodiment causes each three-phase command voltage Vuvw* to cross the zero level, i.e. to have the zero level, during each of (1) The phase interval between a selected lower peak VL of the cyclic carrier signal fc, such as the point P1, and the next upper peak VH thereof, such as the point P2

(2) The phase interval between a selected upper peak VH of the cyclic carrier signal fc, such as the point P4, and the next lower peak VL thereof, such as the point P5

The control apparatus 10 of the first embodiment can cause each three-phase command voltage Vuvw* to cross the zero level, i.e. to have the zero level, during one of (1) The phase interval between a selected lower peak VL of the cyclic carrier signal fc, such as the point P1, and the next upper peak VH thereof, such as the point P2

(2) The phase interval between a selected upper peak VH of the cyclic carrier signal fc, such as the point P4, and the next lower peak VL thereof, such as the point P5

The control apparatus 10 of the first embodiment can cause each three-phase command voltage Vuvw* to be close to the zero level, i.e. to have a level close to the zero level, during at least one of (1) The phase interval between a selected lower peak VL of the cyclic carrier signal fc, such as the point P1, and the next upper peak VH thereof, such as the point P2

(2) The phase interval between a selected upper peak VH of the cyclic carrier signal fc, such as the point P4, and the next lower peak VL thereof, such as the point P5

For switching the upper limit to the lower limit of each three-phase command voltage Vuvw*, the control apparatus 10 of the first embodiment causes the corresponding phase command voltage Vuvw* and the cyclic carrier signal fc to cross the zero level while the voltage Vfc of the cyclic carrier signal f is rising. In addition, for switching the lower limit to the upper limit of each three-phase command voltage Vuvw*, the control apparatus 10 of the first embodiment causes the corresponding phase command voltage Vuvw* and the cyclic carrier signal fc to cross the zero level while the voltage Vfc of the cyclic carrier signal f is falling.

That is, the control apparatus 10 causes the change direction of each three-phase command voltage Vuvw* to be substantially opposite to the change direction of the cyclic carrier signal fc at each common zero-cross point.

Note that the feature that the change direction of each three-phase command voltage Vuvw* is substantially opposite to the change direction of the cyclic carrier signal fc at each zero cross point means that (1) The change direction of the corresponding phase command voltage Vuvw* is one of the positive and negative directions at the corresponding zero cross point (2) The change direction of the cyclic carrier signal fc is the other of the positive and negative directions at the corresponding zero cross point Similarly, the feature that the change direction of each three-phase command voltage Vuvw* is substantially the same as the change direction of the cyclic carrier signal fc at each zero cross point means that (1) The change direction of the corresponding phase command voltage Vuvw* is one of the positive and negative directions at the corresponding zero cross point (2) The change direction of the cyclic carrier signal fc is the same direction as the one of the positive and negative directions at the corresponding zero cross point Additionally, although each three-phase command voltage Vuvw* includes the zero duration between the positive and negative pulses, the change direction of the corresponding phase command voltage Vuvw* is defined from one of the positive and negative pulses before the zero duration to the other of the positive and negative pulses after the zero duration.

That is, when each three-phase command voltage Vuvw* changes from the positive pulse to the negative pulse via the zero duration, the change direction of the corresponding phase command voltage Vuvw* is defined as the voltage decreasing direction. In contrast, when each three-phase command voltage Vuvw* changes from the negative pulse to the positive pulse via the zero duration, the change direction of the corresponding phase command voltage Vuvw* is defined as the voltage increasing direction.

Adjusting the change direction of each three-phase command voltage Vuvw* to be substantially opposite to the change direction of the cyclic carrier signal f at each common zero-cross point prevents unnecessary switching operations of the switches of the inverter 20.

Second Embodiment

Figure 7:
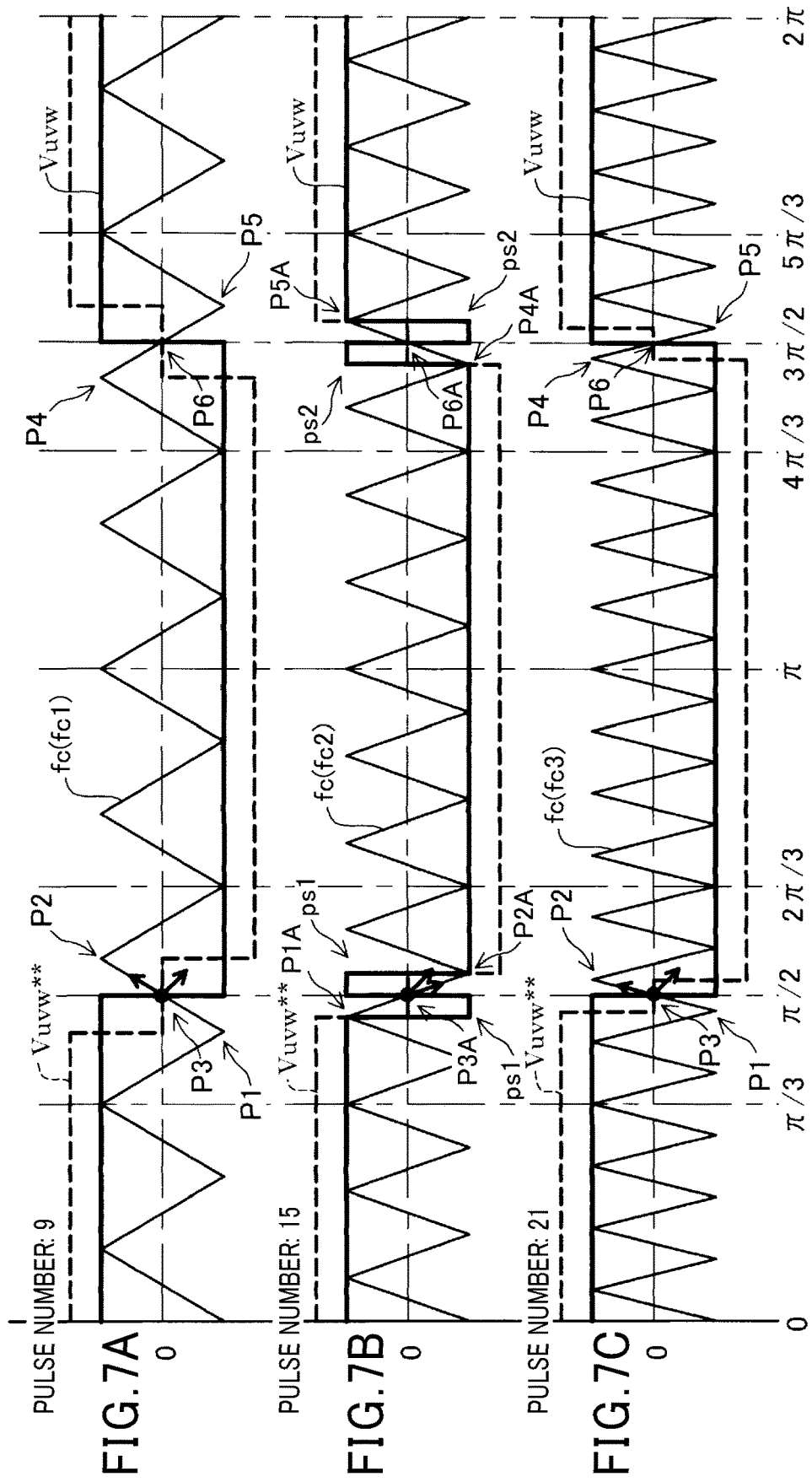
FIG. 7A is a graph schematically illustrating an example of the relationship among a cyclic carrier signal having the pulse number 9, each three-phase command voltage, and the corresponding drive signal according to the second embodiment of the present disclosure.
FIG. 7B is a graph schematically illustrating an example of the relationship among a cyclic carrier signal having the pulse number 15, each three-phase command voltage, and the corresponding drive signal according to the second embodiment of the present disclosure.
FIG. 7C is a graph schematically illustrating an example of the relationship among a cyclic carrier signal having the pulse number 21, each three-phase command voltage, and the corresponding drive signal according to the second embodiment of the present disclosure.

The following describes the second embodiment of the present disclosure with reference to FIGS. 7A to 7C. The structures and/or functions of the control apparatus 10 according to the second embodiment are different from those of the control apparatus 10 according to the first embodiment by the following points. So, the following mainly describes the different points, and omits or simplifies descriptions of like parts between the first and second embodiments, to which identical or like reference characters are assigned, thus eliminating redundant description.

As described above, the carrier generator 140 of the control apparatus 10 is capable of changing the pulse number K of the cyclic carrier signal fc to a different number.

FIG. 7A schematically illustrates an example of the relationship among the cyclic carrier signal fc having the pulse number K=9, each three-phase command voltage Vuvw, and the corresponding drive signal Vuvw. The cyclic carrier signal fc has the pulse number K=9 and satisfies the first waveform condition; the cyclic carrier signal fc having the pulse number K=9 will be referred to as a first carrier signal fc1**.

FIG. 7B schematically illustrates an example of the relationship among the cyclic carrier signal fc having the pulse number K=15, each three-phase command voltage Vuvw, and the corresponding drive signal Vuvw. The cyclic carrier signal fc has the pulse number K=15 and satisfies the first waveform condition; the cyclic carrier signal fc having the pulse number K=15 will be referred to as a second carrier signal fc2**.

FIG. 7C schematically illustrates an example of the relationship among the cyclic carrier signal fc having the pulse number K=21, each three-phase command voltage Vuvw, and the corresponding drive signal Vuvw. The cyclic carrier signal fc has the pulse number K=21 and satisfies the first waveform condition; the cyclic carrier signal fc having the pulse number K=21 will be referred to as a third carrier signal fc3**.

Each of FIGS. 7A to 7C illustrates, for example, that the center of a selected positive pulse of each three-phase command voltage Vuvw is set to the reference phase zero, which matches with a selected lower peak VL thereof, and the zero-cross point P3 of the corresponding cyclic carrier signal fc corresponds to the phase $\pi/2$ of each three-phase command voltage Vuvw.

This prevents each drive signal Vuvw from being divided into two positive and negative pulses at each of the phases of $0, \pi, \pi, \ldots, L\pi$; L is a natural number.

For example, the control unit 200 of the second embodiment causes the carrier generator 140 to switch the pulse number K of one of the first to third carrier signals fc1 to fc3 to a different pulse number of another one of the first to third carrier signals fc1 to fc3 at a timing when a selected one of upper and lower peaks of one of the first to third carrier signals fc1 to fc3 is synchronized with a corresponding one of upper and lower peaks of another one of the first to third carrier signals fc1 to fc3.

For example, an upper peak of each of the first to third carrier signals fc1 to fc3 is synchronized with a corresponding upper peak of another one of the first to third carrier signals fc1 to fc3 at each of the phases of $\pi/3$ and $5\pi/3$ of each three-phase command voltage Vuvw. Similarly, a lower peak of each of the first to third carrier signals fc1 to fc3 is synchronized with a corresponding lower peak of another one of the first to third carrier signals fc1 to fc3 at each of the phases of $0, 2\pi/3, 4\pi/3,$ and $2\pi$ of each three-phase command voltage Vuvw.

For this reason, the control unit 200 of the second embodiment causes the carrier generator 140 to switch the pulse number K of one of the first to third carrier signals fc1 to fc3 to a different pulse number of another one of the first to third carrier signals fc1 to fc3 at a selected one of the phases of $0, \pi/3, 2\pi/3, 4\pi/3, 5\pi/3,$ and $2\pi$ of each three-phase command voltage Vuvw. Hereinafter, each of the phases of $0, \pi/3, 2\pi/3, 4\pi/3, 5\pi/3,$ and $2\pi$ of each three-phase command voltage Vuvw will also be referred to as a pulse-number switchable phase.

This enables the pulse number K of one of the first to third carrier signals fc1 to fc3 to be switched to a different pulse number of another one of the first to third carrier signals fc1 to fc3 at a timing when each three-phase command voltage Vuvw** is kept unchanged.

Each of FIGS. 7A to 7C illustrates by an example that the midpoint P3 of the zero duration from the positive pulse to the negative pulse of each three-phase command voltage Vuvw has the phase $\pi/2$ thereof, and the phase $\pi/2$ of each three-phase command voltage Vuvw is located at the midpoint between the pulse-number switchable phase $\pi/3$ and the pulse-number switchable phase $2\pi/3$.

Similarly, each of FIGS. 7A to 7C illustrates by an example that the midpoint P6 of the zero duration from the negative pulse to the positive pulse of each three-phase command voltage Vuvw has the phase $3\pi/2$ thereof, and the phase $3\pi/2$ of each three-phase command voltage Vuvw is located at the midpoint between the pulse-number switchable phase $4\pi/3$ and the pulse-number switchable phase $5\pi/3$.

From this viewpoint, the control unit 200 causes the carrier generator 140 to generate the cyclic carrier signal fc such that each three-phase command voltage Vuvw and the cyclic carrier signal fc to cross the zero level at a selected phase of the corresponding phase command voltage Vuvw, the selected phase of each three-phase command voltage Vuvw** is located at the midpoint between a pair of adjacent pulse-number switchable phases thereof.

This enables each three-phase command voltage Vuvw to be changed at a timing when the corresponding phase command voltage Vuvw is insulated from the effect of the pulse-number switching of the cyclic carrier signal fc. This also enables the pulse number K the carrier signal fc to be switched to a different number at a timing when each three-phase command voltage Vuvw** is kept unchanged.

In particular, the control unit 200 causes the carrier generator 140 to generate the cyclic carrier signal fc such that the cyclic carrier signal fc has (1) The lower peak VL in synchronization with the center of a selected positive pulse of each three-phase command voltage Vuvw at the phase 0 or $2\pi$ (2) The upper peak VH in synchronization with the center of a selected negative pulse of each three-phase command voltage Vuvw at the phase $\pi$ This therefore enables each drive signal Vuvw to be reliably generated at each of the phases of $0, \pi,$ and $2\pi$ of the corresponding phase command voltage Vuvw**.

FIG. 7B schematically illustrates that, because the second carrier signal fc2 has the pulse number K=15, an upper peak VH of the second carrier signal fc2 is synchronized with the falling edge of a corresponding positive pulse of each three-phase command voltage Vuvw at a point P1A, and a lower peak VL of the second carrier signal fc2 is synchronized with the rising edge of a corresponding negative pulse of each three-phase command voltage Vuvw at a point P4A. For this reason, narrow-width unnecessary pulses ps1 are generated at both sides of a zero-cross point P3A of the second carrier signal fc2 between the ON and OFF pulses of each drive signal Vuvw, and narrow-width unnecessary pulses ps2 are also generated at both sides of a zero-cross point P6A of the second carrier signal fc2 between the ON and OFF pulses of each drive signal Vuvw.

In contrast, when the first carrier signal fc1 having the pulse number K=9 or the third carrier signal fc3 having the pulse number K=21 is used, no narrow-width pulses are generated between the ON and OFF pulses of each drive signal Vuvw.

Comparing the first relationship between for example, the first carrier signal fc1 having the pulse number K=9 and each three-phase command voltage Vuvw with the second relationship between the second carrier signal fc2 having the pulse number K=15 and each three-phase command voltage Vuvw enables the following differences the first and second relationships to be obtained.

Like the third carrier signal fc3 having the pulse number K=21, because the pulse number K=9 of the first carrier signal fc1 satisfies the above equation [3] expressed by "K=6n+3 (n is an odd number)", the change direction of each three-phase command voltage Vuvw* becomes substantially opposite to the change direction of the first carrier signal fc1 at each common zero-cross point, such as the point P3 and the point P6.

In contrast, because the pulse number K=15 of the second carrier signal fc2 does not satisfy the above equation [3] expressed by "K=6n+3 (n is an odd number)", the change direction of each three-phase command voltage Vuvw* becomes substantially the same as the change direction of the second carrier signal fc2 at each common zero-cross point, such as the point P3A and the point P6A.

The above analysis makes clear that (1) No narrow-width pulses are generated between the ON and OFF pulses of each drive signal Vuvw when the change direction of each three-phase command voltage Vu*, Vv*, and Vw* becomes substantially opposite to the change direction of the cyclic carrier signal fc at each common zero-cross point (2) Narrow-width unnecessary pulses are generated at both sides of each zero-cross point of the cyclic carrier signal fc between the ON and OFF pulses of each drive signal Vuvw when the change direction of each three-phase command voltage Vuvw* becomes substantially the same as the change direction of the cyclic carrier signal fc at each common zero-cross point For the above reasons, the control unit 200 is configured to reverse the polarity of the cyclic carrier signal fc to thereby satisfy the second waveform condition for the cyclic carrier signal fc upon determining that the pulse number K of the cyclic carrier signal fc does not satisfy the equation [3] expressed by "K=6n+3 (n is an odd number)" (see step S260).

Alternatively, the control unit 200 is configured to shift the cyclic carrier signal fc by the half cycle, i.e. π electrical degrees, of the cyclic carrier signal fc to thereby satisfy the second waveform condition for the cyclic carrier signal fc upon determining that the pulse number K of the cyclic carrier signal fc does not satisfy the equation [3] expressed by "K=6n+3 (n is an odd number)" (see step S260).

This enables the change direction of each three-phase command voltage Vuvw* to become substantially opposite to the change direction of the cyclic carrier signal fc at each common zero-cross point. This therefore prevents narrow-width unnecessary pulses from being generated between the ON and OFF pulses of each drive signal Vuvw even if the pulse number K of the cyclic carrier signal fc does not satisfy the equation [3] expressed by "K=6n+3 (n is an odd number)". This makes it possible to more accurately perform the single-pulse modulation.

Third Embodiment

Figure 8:
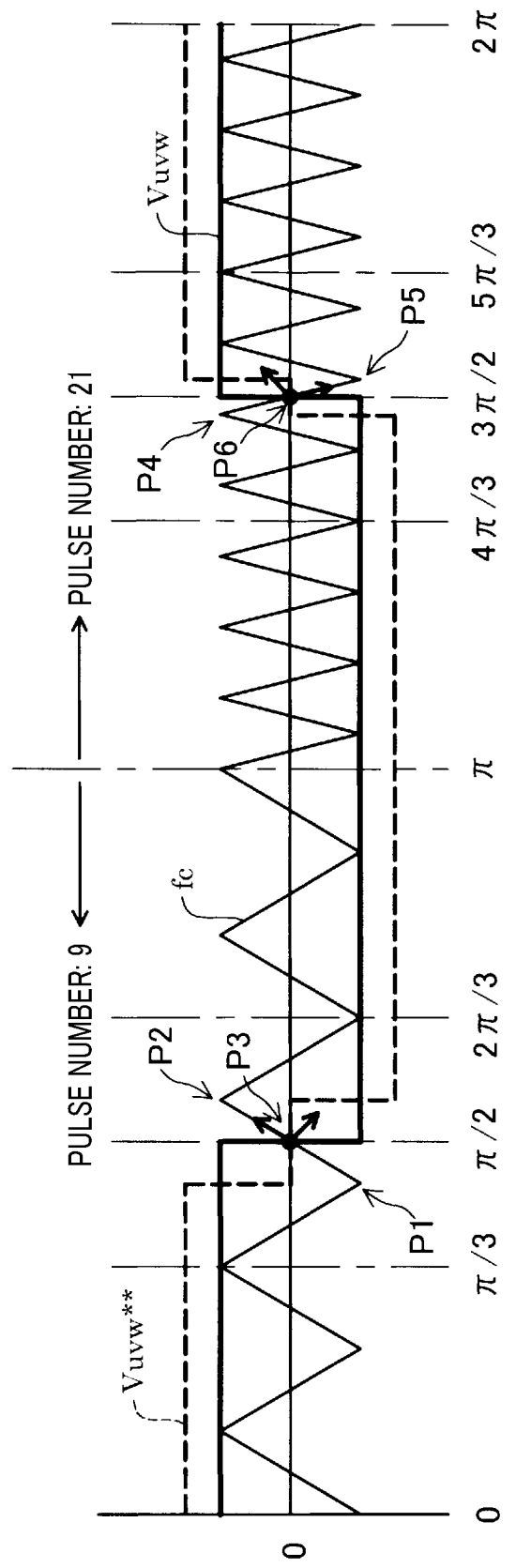
FIG. 8 is a graph schematically illustrating an example of the relationship among the cyclic carrier signal, each three-phase command voltage, and the corresponding drive signal according to the third embodiment of the present disclosure.

The following describes the third embodiment of the present disclosure with reference to FIG. 8. The structures and/or functions of the control apparatus 10 according to the third embodiment are different from those of the control apparatus 10 according to the first embodiment by the following points. So, the following mainly describes the different points, and omits or simplifies descriptions of like parts between the first and third embodiments, to which identical or like reference characters are assigned, thus eliminating redundant description.

As described above, the carrier generator 140 of the control apparatus 10 is capable of changing the pulse number K of the cyclic carrier signal fc to a different number.

FIG. 8 schematically illustrates an example of the relationship among the cyclic carrier signal fc, each three-phase command voltage Vuvw**, and the corresponding drive signal Vuvw according to the third embodiment.

Specifically, the control unit 200 of the third embodiment causes the carrier generator 140 to switch the pulse number K=9 of the cyclic carrier signal fc to the pulse number K=21 thereof at the phase π of each three-phase command voltage Vuvw when the center of a selected positive pulse of the corresponding phase command voltage Vuvw is set to the reference phase zero.

The unswitched pulse number K=9 of the cyclic carrier signal fc satisfies the equation [3] expressed by "K=6n+3 (n is an odd number)", and the switched pulse number K=21 of the carrier signal fc also satisfies the equation [3] expressed by "K=6n+3 (n is an odd number)". That is, the third embodiment focuses on the case where the determination in step S240 is YES, so that the absolute value of the difference between the pulse number K=9 of the cyclic carrier signal fc and the pulse number K=21 of the cyclic carrier signal fc is 12.

FIG. 8 shows that no narrow-width pulses are generated between the ON and OFF pulses of each drive signal Vuvw before and after the pulse number K=9 of the carrier signal fc is switched to the pulse number K=21.

That is, the control unit 200 is configured to change the current value of the pulse number K of the cyclic carrier signal fc to a different number as long as the absolute value of the difference between the changed value of the pulse number K of the cyclic carrier signal fc and the immediately previous value of the pulse number K of the cyclic carrier signal fc is a natural-number multiple of 12.

This configuration maintains the change direction of each three-phase command voltage Vuvw* and the change direction of the cyclic carrier signal fc being substantially opposite to each other at each common zero-cross point, thus preventing narrow-width unnecessary pulses from being generated between the ON and OFF pulses of each drive signal Vuvw. This makes it possible to more accurately perform the single-pulse modulation.

Fourth Embodiment

The following describes the fourth embodiment of the present disclosure with reference to FIG. 9. The structures and/or functions of the control apparatus 10 according to the fourth embodiment are different from those of the control apparatus 10 according to the first embodiment by the following points. So, the following mainly describes the different points, and omits or simplifies descriptions of like parts between the first and fourth embodiments, to which identical or like reference characters are assigned, thus eliminating redundant description.

As described above, the carrier generator 140 of the control apparatus 10 is capable of changing the pulse number K of the cyclic carrier signal fc to a different number.

FIG. 9A schematically illustrates an example of the relationship among the cyclic carrier signal fc, each three-phase command voltage Vuvw**, and the corresponding drive signal Vuvw according to the fourth embodiment.

Specifically, the control unit 200 of the fourth embodiment causes the carrier generator 140 to switch the pulse number K=9 of the cyclic carrier signal fc to the pulse number K=15 thereof at the phase π of each three-phase command voltage Vuvw when the center of a selected positive pulse of the corresponding phase command voltage Vuvw is set to the reference phase zero.

The unswitched pulse number K=9 of the cyclic carrier signal fc satisfies the equation [3] expressed by "K=6n+3 (n is an odd number)", but the switched pulse number K=15 of the carrier signal fc does not satisfy the equation [3] expressed by "K=6n+3 (n is an odd number)". That is, the fourth embodiment focuses on the case where the determination in step S240 is NO.

As illustrated in FIG. 9A, if the control unit 200 maintained the current waveform pattern of the cyclic carrier signal fc, which does not have the pulse number K equal to (6n+3), unchanged, narrow-width unnecessary pulses ps2 would be generated at both sides of a zero-cross point P6A of the cyclic carrier signal fc with the pulse number K=15 between the ON and OFF pulses of each drive signal Vuvw. That is, the absolute value of the difference between the changed current value 15 of the pulse number K of the cyclic carrier signal fc and the immediately previous value 9 of the pulse number K of the cyclic carrier signal fc is (1) A natural-number multiple of 6
(2) Not a natural-number multiple of 12

From this viewpoint, after switching the pulse number K of the cyclic carrier signal fc to a different number, so that the absolute value of the pulse-number difference before and after the pulse-number switching is a natural-number multiple of 6, but not a natural-number multiple of 12, the control unit 200 performs one of (1) Reversing the polarity of the switched waveform pattern of the cyclic carrier signal fc to thereby satisfy the second waveform condition for the cyclic carrier signal fc (see FIG. 9B)
(2) Shifting the switched waveform pattern of the cyclic carrier signal fc by the half cycle, i.e. π electrical degrees, of the cyclic carrier signal fc in its forward direction or backward direction to thereby satisfy the second waveform condition for the cyclic carrier signal fc (see FIG. 9B)

This enables (1) Each three-phase command voltage Vuvw** to cross the cyclic carrier signal fc at the point P6 between the points P4 and P5
(2) The change direction of each three-phase command voltage Vu*, Vv*, and Vw* to be substantially opposite to the change direction of the cyclic carrier signal fc at the common zero-cross point P6

This therefore prevents narrow-width unnecessary pulses from being generated between the ON and OFF pulses of each drive signal Vuvw, making it possible to more accurately perform the single-pulse modulation.

Fifth Embodiment

Figure 10B:
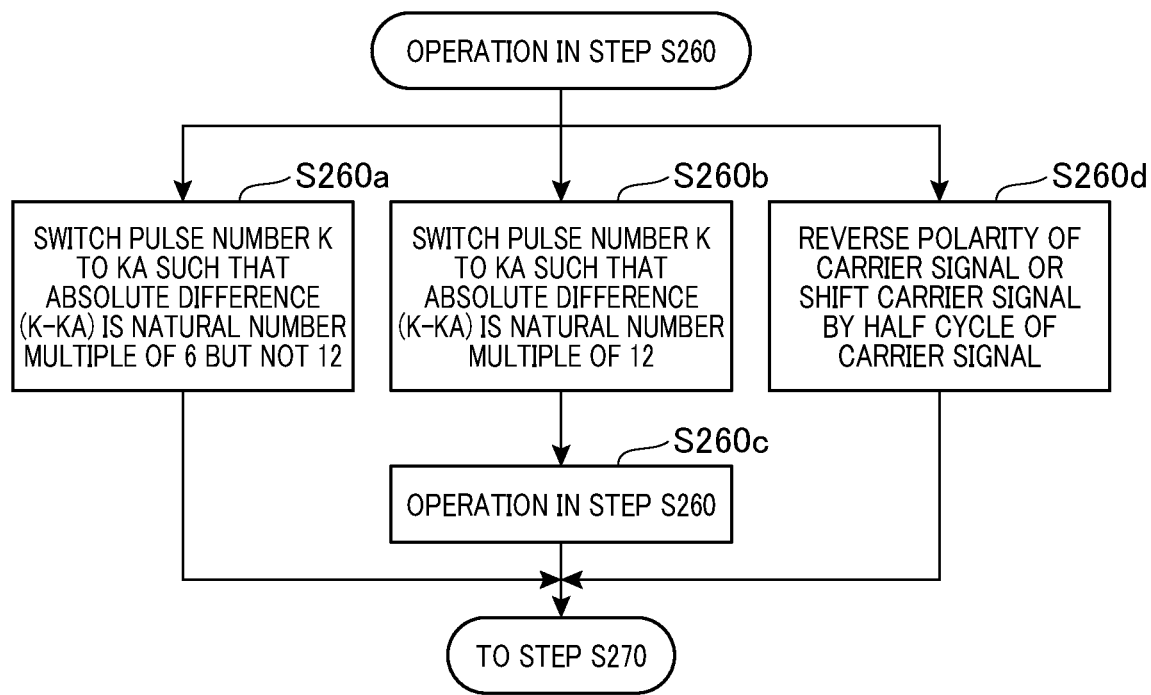
FIG. 10B is a flowchart schematically illustrating specific examples of the operation in step S260 illustrated in FIG. 4 according to the fifth embodiment.

The following describes the fifth embodiment of the present disclosure with reference to FIGS. 10A and 10B. The structures and/or functions of the control apparatus 10 according to the fifth embodiment are different from those of the control apparatus 10 according to the first embodiment by the following points. So, the following mainly describes the different points, and omits or simplifies descriptions of like parts between the first and fifth embodiments, to which identical or like reference characters are assigned, thus eliminating redundant description.

As described above, the carrier generator 140 of the control apparatus 10 is capable of changing the pulse number K of the cyclic carrier signal fc to a different number.

FIG. 10A schematically illustrates an example of the relationship among the cyclic carrier signal fc, each three-phase command voltage Vuvw**, and the corresponding drive signal Vuvw according to the fifth embodiment.

Specifically, the control unit 200 of the fifth embodiment causes the carrier generator 140 to switch the pulse number K=15 of the cyclic carrier signal fc to a different number at the phase π of each three-phase command voltage Vuvw when the center of a selected positive pulse of the corresponding phase command voltage Vuvw is set to the reference phase zero.

The unswitched pulse number K=15 of the cyclic carrier signal fc does not satisfy the equation [3] expressed by "K=6n+3 (n is an odd number)", so that the determination in step S210 is negative.

As illustrated in FIG. 10A, narrow-width unnecessary pulses ps1 would be generated at both sides of a zero-cross point P3A of the cyclic carrier signal fc with the pulse number K=15 between the ON and OFF pulses of each drive signal Vuvw.

For addressing such an issue, the control unit 200 selectably performs one of the following first to third pulse-number change tasks as the operation in step S260.

As the first pulse-number changing task, the control unit 200 causes the carrier generator 140 to switch the pulse number K=15 of the cyclic carrier signal fc to a specific pulse number KA such that the absolute value of the difference between the changed pulse number KA and the immediately previous pulse number K of the cyclic carrier signal fc is a natural-number multiple of 6, but is not a natural-number multiple of 12 in step S260a (see FIG. 10B).

For example, the control unit 200 causes the carrier generator 140 to switch the pulse number K=15 of the cyclic carrier signal fc to 9 as the specific pulse number KA in step S260a; the switched pulse number KA=9 satisfies the equation [3] expressed by "K=6n+3 (n is an odd number)".

Although the unswitched pulse number K=15 of the cyclic carrier signal fc does not satisfy the equation [3] expressed by "K=6n+3 (n is an odd number)", but the switched pulse number KA, such as 9, of the carrier signal fc satisfies the equation [3] expressed by "K=6n+3 (n is an odd number)".

This enables the change direction of each three-phase command voltage Vuvw* and the change direction of the cyclic carrier signal fc being substantially opposite to each other at each common zero-cross point, thus preventing narrow-width unnecessary pulses from being generated between the ON and OFF pulses of each drive signal Vuvw.

Note that the operation in step S260a reduces the pulse number K=15 of the cyclic carrier signal fc to the pulse number K=9 thereof, but can increase the pulse number K=15 of the cyclic carrier signal fc to the specific pulse number KA, such as 21, which satisfies the equation [3] expressed by "K=6n+3 (n is an odd number)".

Alternatively, as the second pulse-number changing task, the control unit 200 causes the carrier generator 140 to switch the pulse number K=15 of the cyclic carrier signal fc to a specific pulse number KA such that the absolute value of the difference between the changed pulse number KA and the immediately previous pulse number K of the cyclic carrier signal fc is a natural-number multiple of 12 in step S260b (see FIG. 10B).

For example, the control unit 200 causes the carrier generator 140 to switch the pulse number K=15 of the cyclic carrier signal fc to 27 as the specific pulse number KA in step S260b.

Next, in step S260c, the control unit 200 performs one of (1) Reversing the polarity of the cyclic carrier signal fc having the switched specific pulse number KA to thereby satisfy the second waveform condition for the cyclic carrier signal fc (2) Shifting the cyclic carrier signal fc having the switched specific pulse number KA by the half cycle, i.e. $\pi$ electrical degrees, of the cyclic carrier signal fc in its forward direction or backward direction to thereby satisfy the second waveform condition for the cyclic carrier signal fc This enables the change direction of each three-phase command voltage Vuvw* and the change direction of the cyclic carrier signal fc being substantially opposite to each other at each common zero-cross point, thus preventing narrow-width unnecessary pulses from being generated between the ON and OFF pulses of each drive signal Vuvw.

Alternatively, as the third pulse-number changing task, in step S260d, the control unit 200 causes, as one of the pulse-number switchable phases, the carrier generator 140 to (1) Reverse the polarity of the cyclic carrier signal fc having the pulse number K=15 to thereby satisfy the second waveform condition for the cyclic carrier signal fc (2) Shifting the cyclic carrier signal fc having the pulse number K=15 by the half cycle, i.e. $\pi$ electrical degrees, of the cyclic carrier signal fc in its forward direction or backward direction to thereby satisfy the second waveform condition for the cyclic carrier signal fc This enables the change direction of each three-phase command voltage Vuvw* and the change direction of the cyclic carrier signal fc being substantially opposite to each other at each common zero-cross point, thus preventing narrow-width unnecessary pulses from being generated between the ON and OFF pulses of each drive signal Vuvw. This makes it possible to more accurately perform the single-pulse modulation.

Sixth Embodiment

Figure 11:
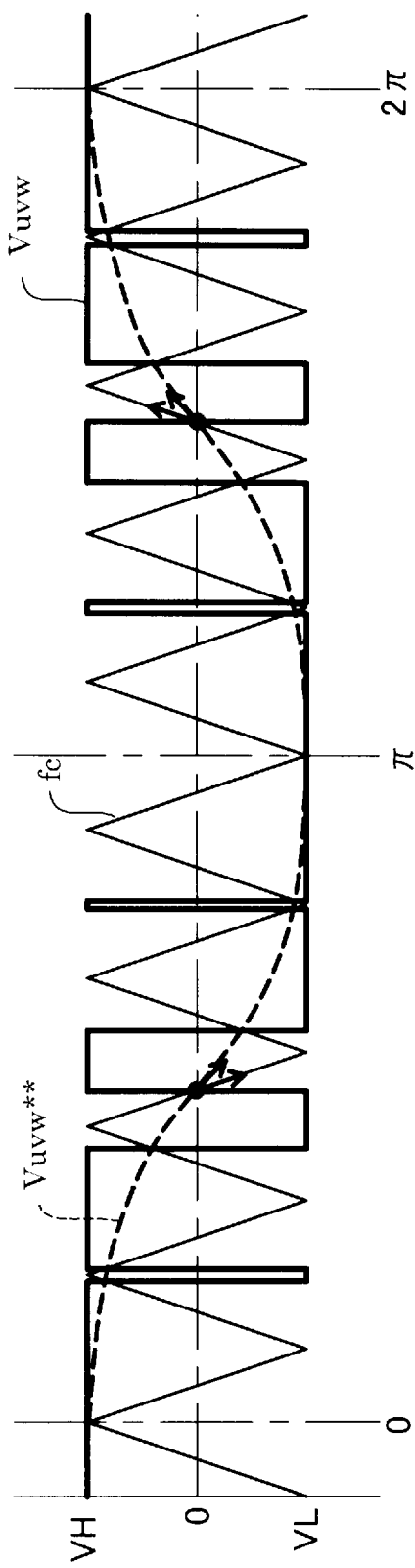
FIG. 11 is a graph schematically illustrating an example of the relationship among the cyclic carrier signal that satisfies a second waveform condition, each three-phase command voltage, and the corresponding drive signal according to the sixth embodiment of the present disclosure.
Figure 12:
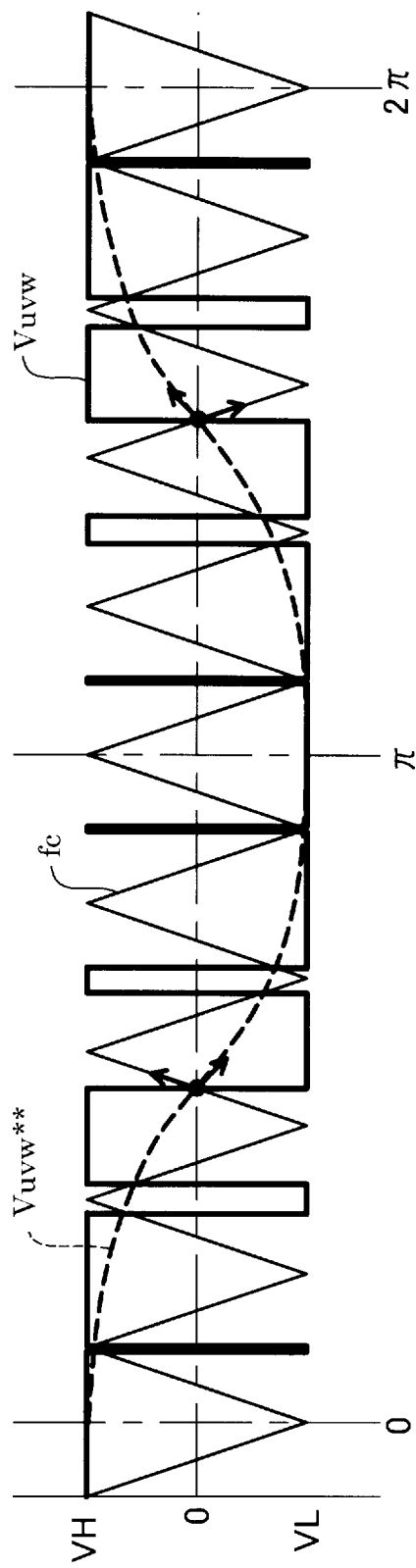
FIG. 12 is a graph schematically illustrating an example of the relationship among the cyclic carrier signal that satisfies a first waveform condition, each three-phase command voltage, and the corresponding drive signal according to the sixth embodiment.

The following describes the sixth embodiment of the present disclosure with reference to FIGS. 11 and 12. The structures and/or functions of the control apparatus 10 according to the sixth embodiment are different from those of the control apparatus 10 according to the first embodiment by the following points. So, the following mainly describes the different points, and omits or simplifies descriptions of like parts between the first and sixth embodiments, to which identical or like reference characters are assigned, thus eliminating redundant description.

FIG. 11 schematically illustrates an example of the relationship among the cyclic carrier signal fc that satisfies the second waveform condition, each three-phase command voltage Vuvw, and the corresponding drive signal Vuvw according to the sixth embodiment. FIG. 12 also schematically illustrates an example of the relationship among the cyclic carrier signal fc that satisfies the first waveform condition, each three-phase command voltage Vuvw, and the corresponding drive signal Vuvw according to the sixth embodiment.

That is, each of FIGS. 11 and 12 shows that the control unit 200 causes the drive signal generator 150 to perform the sinusoidal PWM control routine that controls the inverter 20 in the sinusoidal PWM in step S150 upon determining that each of the determinations in steps S110 and S130 is negative. Note that, the control unit 200 causes the drive signal generator 150 to perform the single-pulse modulation control routine that controls the inverter 20 in the single-pulse modulation in step S120 described in the above embodiments.

Because each of the three-phase command voltages Vuvw has a sinusoidal waveform, each three-phase command voltage Vuvw has its upper peak at each of the phase zero and the phase $2\pi$, and has its lower peak at the phase $\pi$. In addition, each three-phase command voltage Vuvw** has the zero level at each of the phase $\pi/2$ and the phase $3\pi/2$. The cyclic carrier signal fc has the zero level at each of the phase $\pi/2$ and the phase $3\pi/2$ independently of the cyclic carrier signal fc satisfying the first waveform condition and the second waveform condition.

For the above reasons, each three-phase command voltage Vuvw* and the cyclic carrier signal fc cross the zero level when the three-phase command voltage Vuvw* has the phase of $\pi/2$ or the phase $3\pi/2$.

The difference point between FIGS. 11 and 12 is that (1) The change direction of each three-phase command voltage Vuvw* is substantially the same as the change direction of the cyclic carrier signal fc at each common zero-cross point in FIG. 11

(2) The change direction of each three-phase command voltage Vuvw* is substantially opposite to the change direction of the cyclic carrier signal fc at each common zero-cross point in FIG. 12

The pulse number K of the cyclic carrier signal fc is an odd multiple of 3, i.e. 3, 9, 15, 21, . . . independently of the cyclic carrier signal fc satisfying the first waveform condition or the second waveform condition.

As illustrated in FIGS. 11 and 12, the control unit 200 permits the drive signal generator 150 to perform the sinusoidal PWM control routine independently of whether (1) The change direction of each three-phase command voltage Vuvw* is substantially the same as the change direction of the cyclic carrier signal fc at each common zero-cross point in FIG. 11

(2) The change direction of each three-phase command voltage Vuvw* is substantially opposite to the change direction of the cyclic carrier signal fc at each common zero-cross point in FIG. 12

That is, the control unit 200 causes the rive signal generator 150 to perform the sinusoidal PWM control routine including the overmodulation control routine such that the pulse number K of the cyclic carrier signal fc is set to an odd multiple of 3 for one cycle (electrical angle $2\pi$) of each three-phase command voltage Vuvw* independently of the change direction of the corresponding phase command voltage Vuvw* and the change direction of the cyclic carrier signal fc at each common zero-cross point.

This configuration eliminates the need for the control unit 200 to check whether the change direction of each three-phase command voltage Vuvw* and the change direction of the cyclic carrier signal fc are the same as each other or different from each other during execution of the sinusoidal PWM control routine. This makes it easier and simpler for the control unit 200 to perform the sinusoidal PWM control routine including the overmodulation control routine. In addition, the control apparatus 10 enables both the sinusoidal PWM including the overmodulation PWM and the single-pulse modulation to be carried out using the cyclic carrier signal fc without switching the modulation mode of the control apparatus 10 between sinusoidal PWM mode and single-pulse modulation mode.

Seventh Embodiment

Figure 13:
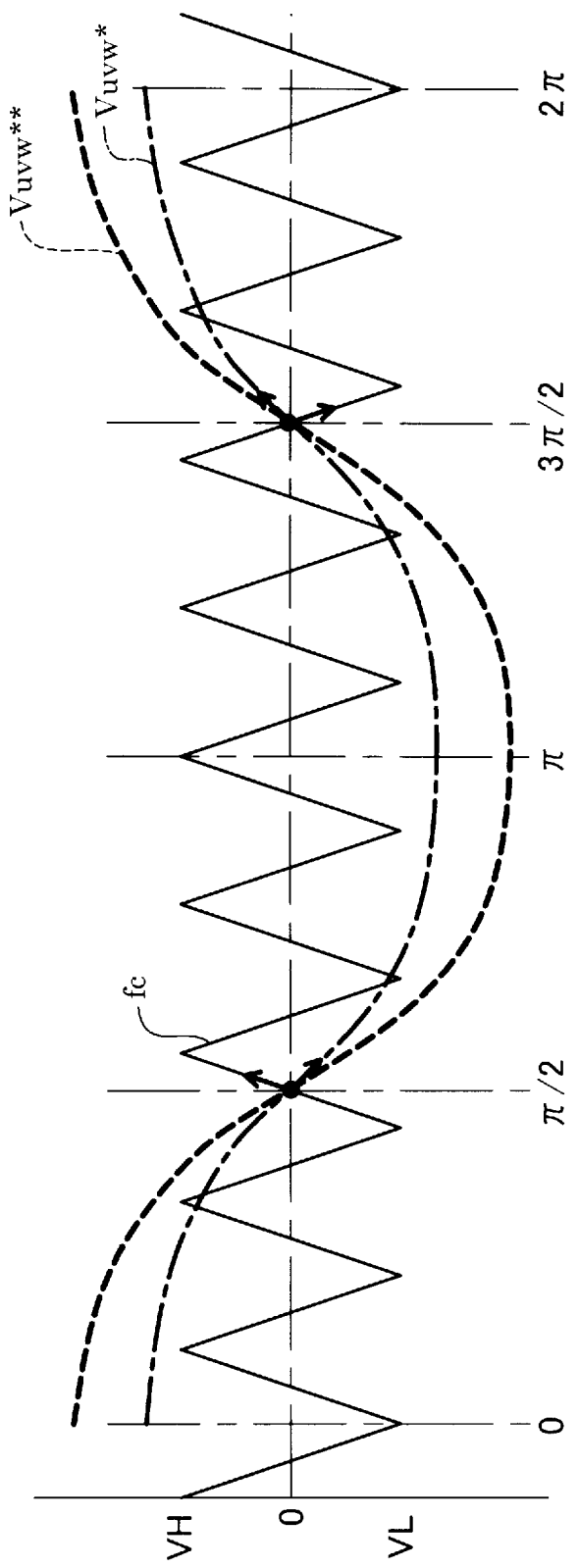
FIG. 13 is a graph schematically illustrating an example of the relationship among the cyclic carrier signal, each uncompensated three-phase command voltage, and the corresponding compensated phase command voltage according to the seventh embodiment of the present disclosure.

The following describes the seventh embodiment of the present disclosure with reference to FIG. 13. The structures and/or functions of the control apparatus 10 according to the seventh embodiment are different from those of the control apparatus 10 according to the first embodiment by the following points. So, the following mainly describes the different points, and omits or simplifies descriptions of like parts between the first and seventh embodiments, to which identical or like reference characters are assigned, thus eliminating redundant description.

FIG. 13 schematically illustrates an example of the relationship among the cyclic carrier signal fc, each uncompensated three-phase command voltage Vuvw*, and the corresponding compensated phase command voltage Vuvw** according to the seventh embodiment.

The seventh embodiment focuses on how the amplitude compensator 130 compensates for the amplitude of each three-phase command voltages Vuvw*.

While the amplitude MAX(Vuvw*) of each three-phase command voltage Vuvw* is equal to or higher than the upper peak VH of the cyclic carrier signal fc, the control unit 200 is configured to perform the overmodulation control routine or the single-pulse modulation control routine set forth above. For this reason, each drive signal Vuvw does not have a linear relationship with the corresponding phase command voltage Vuvw*.

From this viewpoint, while the inverter 20 is controlled in the overmodulation PWM or the single-pulse modulation, the amplitude compensator 130 increases the amplitude of each of the three-phase command voltages Vuvw* based on the modulation factor command m* to thereby compensate for the amplitude of each of the three-phase command voltages Vuvw*. Then, the amplitude compensator 130 outputs, to the drive signal generator 150, the amplitude-compensated three-phase command voltages Vuvw* as three-phase command voltages Vuvw**.

This enables the drive signal generator 150 to compare the voltage Vfc of the cyclic carrier signal fc with each three-phase command voltage Vuvw** to thereby generate the corresponding phase drive signal Vuvw.

This results in each drive signal Vuvw having a relationship with the corresponding phase command voltage Vuvw* being closer to a linear relationship. Note that, when the inverter 20 is controlled in the sinusoidal PWM, it is unnecessary to compensate for the amplitude of each of the three-phase command voltages Vuvw*, because the amplitude MAX(Vuvw*) of each three-phase command voltage Vuvw* is lower than the upper peak VH of the cyclic carrier signal fc.

Note that FIG. 13 illustrates that the amplitude compensator 130 increases each of the sinusoidal three-phase command voltages Vuvw* in the amplitude direction, but the present disclosure is not limited thereto. Specifically, the amplitude compensator 130 can be configured to increase, in the overmodulation PWM.

(1) The positive peak up to a predetermined first limit value larger than the upper limit VH of the cyclic carrier signal fc (2) The absolute value of the negative peak up to a predetermined second limit larger than the absolute value of the negative peak VL of the cyclic carrier signal fc This enables the compensated waveform of each three-phase command voltage Vuvw** to be closer to a rectangular waveform.

Eighth Embodiment

Figure 14:
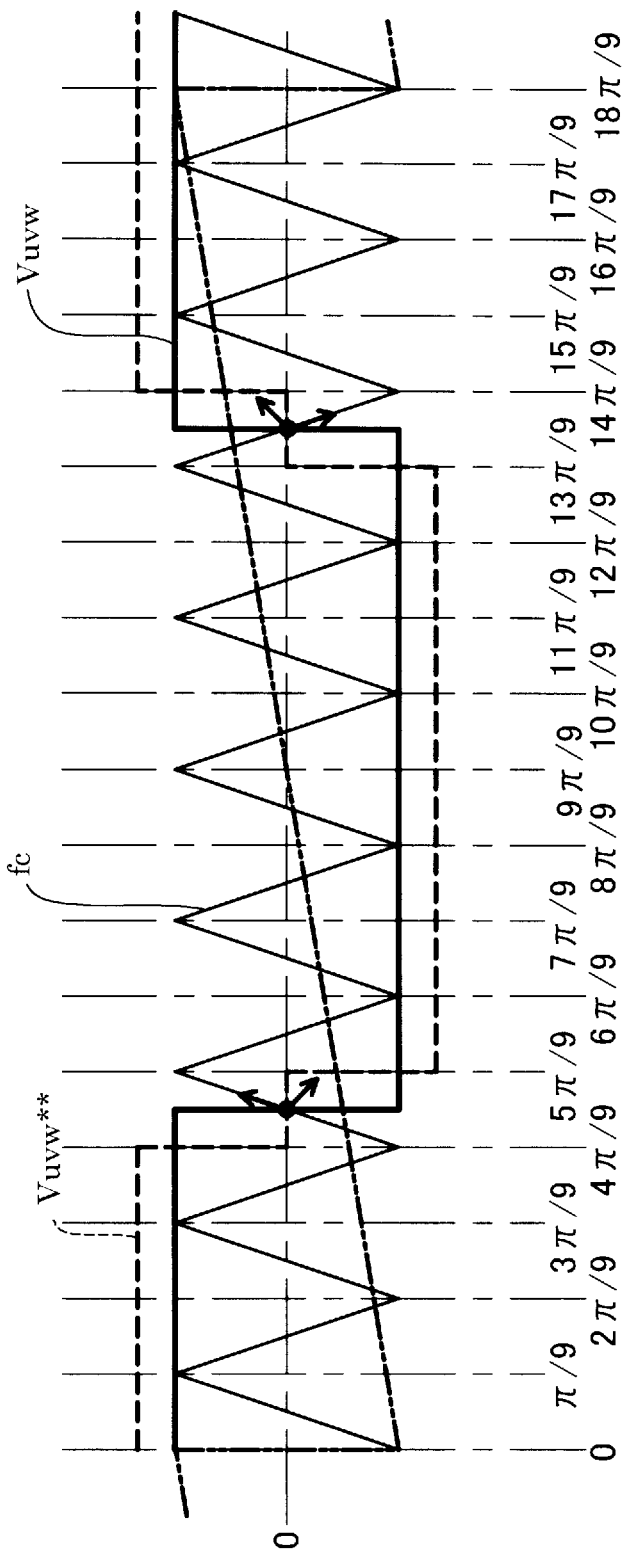
FIG. 14 is a graph schematically illustrating an example of the relationship among the cyclic carrier signal that satisfies the first waveform condition and has the pulse number 9, each three-phase command voltage, the corresponding drive signal, and the electrical angular phase of the corresponding phase command voltage according to the eighth embodiment of the present disclosure.
Figure 15:
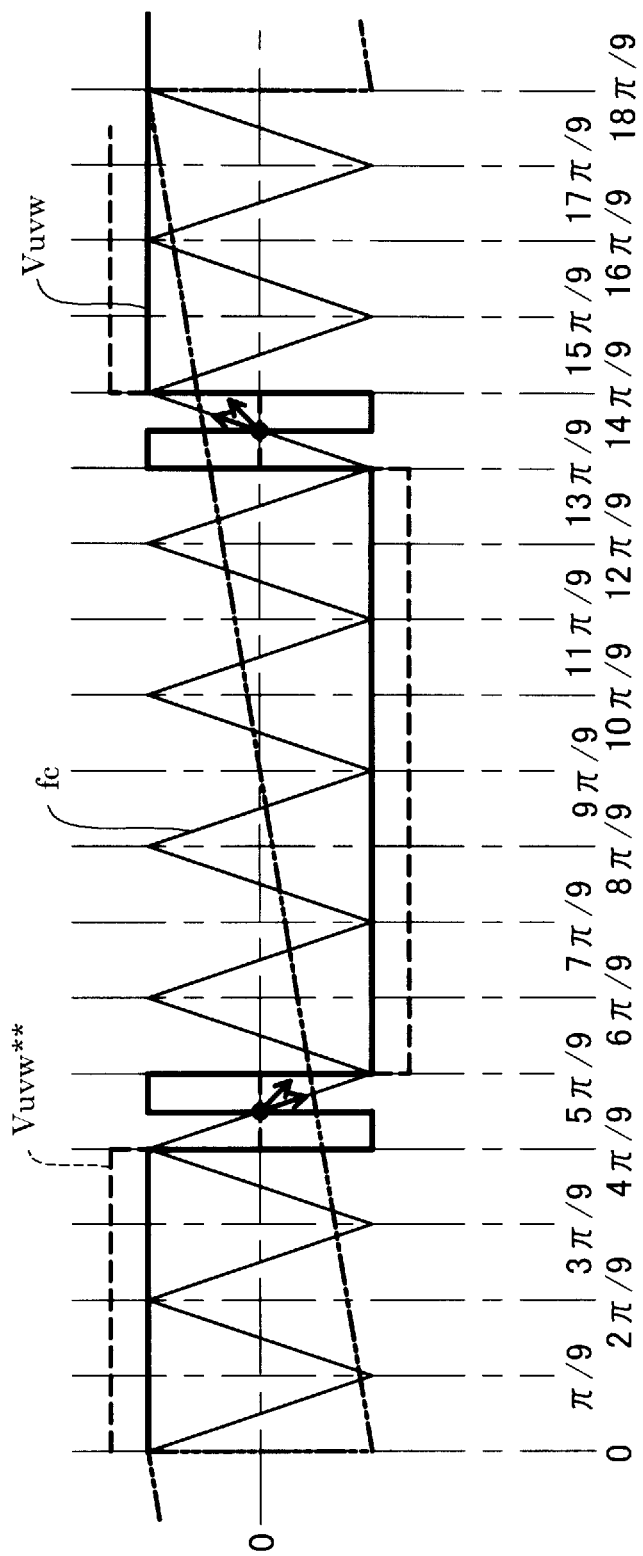
FIG. 15 is a graph schematically illustrating an example of the relationship among the cyclic carrier signal that satisfies the second waveform condition and has the pulse number 9, each three-phase command voltage, the corresponding drive signal, and the electrical angular phase of the corresponding phase command voltage according to the eighth embodiment.

The following describes the eighth embodiment of the present disclosure with reference to FIGS. 14 and 15. The structures and/or functions of the control apparatus 10 according to the eighth embodiment are different from those of the control apparatus 10 according to the first embodiment by the following points. So, the following mainly describes the different points, and omits or simplifies descriptions of like parts between the first and eighth embodiments, to which identical or like reference characters are assigned, thus eliminating redundant description.

FIG. 14 schematically illustrates an example of the relationship among the cyclic carrier signal fc that satisfies the first waveform condition and has the pulse number K=9, each three-phase command voltage Vuvw, the corresponding drive signal Vuvw, and the electrical angular phase of the corresponding phase command voltage Vuvw (see two-dot chain line) according to the eighth embodiment. FIG. 15 also schematically illustrates an example of the relationship among the cyclic carrier signal fc that satisfies the second waveform condition and has the pulse number K=9, each three-phase command voltage Vuvw, the corresponding drive signal Vuvw, and the electrical angular phase of the corresponding phase command voltage Vuvw (see two-dot chain line) according to the eighth embodiment.

For example, the control unit 200 of the eighth embodiment is configured to set, for example, a flag representing whether the cyclic carrier signal fc satisfies the first waveform condition or the second waveform condition. For example, the control unit 200 sets the flag being 0 indicative of the cyclic carrier signal fc satisfying the first waveform condition, and sets the flag being 1 indicative of the cyclic carrier signal fc satisfying the second waveform condition.

FIG. 14 schematically illustrates that the cyclic carrier signal fc increases when the phase of the cyclic carrier signal fc is located within one of the following ranges of the electrical angular phase of each three-phase command voltage Vuvw**:

1. 0 to $\pi/9$
2. $2\pi/9$ to $3\pi/9$
3. $4\pi/9$ to $5\pi/9$
4. $6\pi/9$ to $7\pi/9$
5. $8\pi/9$ to $9\pi/9$
6. $10\pi/9$ to $11\pi/9$
7. $12\pi/9$ to $13\pi/9$
8. $14\pi/9$ to $15\pi/9$

9. $16\pi/9$ to $17\pi/9$

Note that, for the sake of simple comparison between the above phase ranges, some of the phase ranges each expressed by fractions are not reduced in the eighth embodiment.

This makes clear that the cyclic carrier signal fc increases when the phase of the cyclic carrier signal fc is located within one of the ranges from $(2p)\pi/K$ to $(2p+1)\pi/K$ where 1. K is the pulse number of the cyclic carrier signal fc within the electrical angular phase of each phase command voltage Vuvw** from 0 to $2\pi$ 2. p is an integer equal to or more than 0

Additionally, FIG. 14 schematically illustrates that the cyclic carrier signal fc decreases when the phase of the cyclic carrier signal fc is located within one of the following ranges of the electrical angular phase of each three-phase command voltage Vuvw**:

1. $\pi/9$ to $2\pi/9$
2. $3\pi/9$ to $4\pi/9$
3. $5\pi/9$ to $6\pi/9$
4. $7\pi/9$ to $8\pi/9$
5. $9\pi/9$ to $10\pi/9$
6. $11\pi/9$ to $12\pi/9$
7. $13\pi/9$ to $14\pi/9$
8. $15\pi/9$ to $16\pi/9$
9. $17\pi/9$ to $18\pi/9$

This makes clear that the cyclic carrier signal fc decreases when the phase of the cyclic carrier signal fc is located within one of the ranges from $(2q-1)\pi/K$ to $(2q)\pi/K$ where 1. K is the pulse number of the cyclic carrier signal fc within the electrical angular phase of each phase command voltage Vuvw** from 0 to $2\pi$ 2. q is an integer equal to or more than 1

FIG. 15 schematically illustrates that the cyclic carrier signal fc increases when the phase of the cyclic carrier signal fc is located within one of the following ranges of the electrical angular phase of each three-phase command voltage Vuvw**:

1. $\pi/9$ to $2\pi/9$
2. $3\pi/9$ to $4\pi/9$
3. $5\pi/9$ to $6\pi/9$
4. $7\pi/9$ to $8\pi/9$
5. $9\pi/9$ to $10\pi/9$
6. $11\pi/9$ to $12\pi/9$
7. $13\pi/9$ to $14\pi/9$
8. $15\pi/9$ to $16\pi/9$
9. $17\pi/9$ to $18\pi/9$

This makes clear that the cyclic carrier signal fc increases when the phase of the cyclic carrier signal fc is located within one of the ranges from $(2q-1)\pi/K$ to $(2q)\pi/K$ where 1. K is the pulse number of the cyclic carrier signal fc within the electrical angular phase of each phase command voltage Vuvw** from 0 to $2\pi$ 2. q is an integer equal to or more than 1

Additionally, FIG. 15 schematically illustrates that the cyclic carrier signal fc decreases when the phase of the cyclic carrier signal fc is located within one of the following ranges of the electrical angular phase of each three-phase command voltage Vuvw**:

1. 0 to $\pi/9$
2. $2\pi/9$ to $3\pi/9$
3. $4\pi/9$ to $5\pi/9$
4. $6\pi/9$ to $7\pi/9$
5. $8\pi/9$ to $9\pi/9$
6. $10\pi/9$ to $11\pi/9$
7. $12\pi/9$ to $13\pi/9$
8. $14\pi/9$ to $15\pi/9$
9. $16\pi/9$ to $17\pi/9$

This makes clear that the cyclic carrier signal fc decreases when the phase of the cyclic carrier signal fc is located within one of the ranges from $(2p)\pi/K$ to $(2p+1)\pi/K$ where 1. K is the pulse number of the cyclic carrier signal fc within the electrical angular phase of each three-phase command voltage Vuvw** from 0 to $2\pi$ 2. p is an integer equal to or more than 0

Note that, in FIG. 15, the cyclic carrier signal fc satisfies the second waveform condition, so that a half-size triangular carrier pulse is located at the reference phase zero of each three-phase command voltage Vuvw, and a half-size triangular carrier pulse is located at the phase $2\pi$ of the corresponding phase command voltage Vuvw. At that time, because the reference phase zero is the same as the phase $2\pi$ of each three-phase command voltage Vuvw, the half-size triangular carrier pulse located at the respective reference phase zero and phase $2\pi$ are rolled into one triangular pulse, so that the cyclic carrier signal fc satisfying the second waveform condition illustrated in FIG. 15** has the pulse number K=9. This feature in the eighth embodiment can be applied to the other embodiments.

Each of FIGS. 14 and 15 shows that each three-phase command voltage Vuvw** and the cyclic carrier signal fc commonly cross the zero level at each of the phase $\pi/2$, which is located between the phase $4\pi/9$ and the phase $5\pi/9$, and the phase $3\pi/2$, which is located between the phase $13\pi/9$ and the phase $14\pi/9$.

This enables the control unit 200 to easily determine whether the cyclic carrier signal fc increases or decreases at each of zero-cross point in accordance with the phase of the corresponding zero-cross point relative to the reference phase of zero, each phase command voltage Vuvw**, and the flag. The above configuration of the eighth embodiment can be used for each of the first to seventh embodiments.

Each of the first to eighth embodiments uses a cyclic triangular carrier signal as the cyclic carrier signal fc, but the present disclosure can use one of cyclic carrier signals whose phase synchronized with the rotating magnetic field of a rotary electric machine.

The control apparatuses according to the present disclosure are not limited to be applied to MGs for mobile vehicles, and can be applied to various rotary electric machines in various fields. The control apparatuses according to the present disclosure can be applied to at least one-phase rotary electric machine or a multiphase rotary electric machine, such as two-phase or four or more phase rotary electric machine.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated. At least part of the structure of each embodiment can be replaced with or added to the structure of another one of the embodiments. All aspects included in the technological ideas specified by the language employed by the claims constitute embodiments of the present disclosure.

The present disclosure can be implemented by various embodiments; the various embodiments include systems each including the control apparatus, programs for serving a computer as the control apparatus 10, storage media, such as non-transitory media, storing the programs, and control methods for controlling a rotary electric machine.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control apparatus for controlling, via a power converter for power conversion of a direct-current voltage input thereto, a multiphase rotary electric machine that has a rotating magnetic field, the control apparatus comprising:
   a command voltage generator configured to generate a command voltage with first positive and negative peaks relative to a zero voltage level for at least one phase of the multiphase rotary electric machine;
   a carrier signal generator configured to generate a cyclic carrier signal having:
      cyclic carrier pulses with second positive and negative peaks relative to the zero voltage level; and
      a phase synchronized with the rotating magnetic field; and
   a controller configured to control the carrier signal generator,
   the controller being configured to perform a comparison between the command voltage and the cyclic carrier signal to thereby perform one of:
      as a first result of the comparison, pulse-width modulation upon an amplitude of each of the first positive and negative peaks of the command voltage being within or identical to the corresponding one of the second positive and negative peaks of the cyclic carrier signal; or
      as a second result of the comparison, single-pulse modulation upon the amplitude of each of the first positive and negative peaks of the command voltage being outside the corresponding one of the second positive and negative peaks of the cyclic carrier signal,
   the pulse-width modulation being configured to generate, for each cycle of the command voltage, plural drive pulses for driving the power converter,
   the single-pulse modulation being configured to generate, for each cycle of the command voltage, a single positive pulse and a single negative pulse for driving the power converter,
   in the single-pulse modulation, the amplitude of each of the first positive peaks of the command voltage being higher than the amplitude of the corresponding one of the second positive peaks of the cyclic carrier signal, and the amplitude of each of the first negative peaks of the command voltage being lower than the amplitude of the corresponding one of the second negative peaks of the cyclic carrier signal.

2. The control apparatus according to claim 1, wherein:
   the controller is configured to switch, in the single-pulse modulation, one of the first positive and negative peaks of the command voltage to the other while preventing an occurrence of narrow-width pulses as drive pulses for the rotary electric machine, the narrow-width pulses each having a width narrower than a width of each of the single positive and negative pulses.

3. The control apparatus according to claim 1, wherein:
   the controller is configured to switch, in the single-pulse modulation, one of the first positive and negative peaks of the command voltage to the other in synchronization with a selected one of the second positive peaks or a selected one of the second negative peaks.

4. The control apparatus according to claim 1, wherein:
   the cyclic carrier signal is a triangular carrier signal; and
   the controller is configured to change, in the single-pulse modulation, the number of the carrier pulses of the triangular carrier signal for each cycle of the command voltage to a different number of a switched triangular carrier signal at a timing when a selected one of the upper and lower peaks of the triangular carrier signal is synchronized with a corresponding one of the upper and lower peaks of the switched triangular carrier signal.

5. The control apparatus according to claim 1, wherein:
   the cyclic carrier signal is a triangular carrier signal;
   the number of the carrier pulses of the triangular carrier signal for each cycle of the command voltage is referred to as K; and
   the controller is configured to change, in the single-pulse modulation, the number K of the carrier pulses of the triangular carrier signal for each cycle of the command voltage to an odd multiple of 3.

6. The control apparatus according to claim 1, wherein:
   the cyclic carrier signal is a triangular carrier signal;
   the number of the carrier pulses of the triangular carrier signal for each cycle of the command voltage is referred to as K; and
   the controller is configured to determine, in the single-pulse modulation, whether the triangular carrier signal is increasing or decreasing at a point when the command voltage and the triangular carrier signal concurrently cross the zero level in accordance with:
   the number K of the carrier pulses of the triangular carrier signal;
   the command voltage; and
   the phase of the command voltage relative to a reference phase.

7. The control apparatus according to claim 1, wherein:
   the cyclic carrier signal is a triangular carrier signal; and
   the controller is configured to cause, in the single-pulse modulation, the command voltage and the triangular carrier signal to concurrently cross the zero level such that a change direction of the command voltage and a change direction of the triangular carrier signal are opposite to each other.

8. The control apparatus according to claim 7, wherein:
   the controller is configured to:
   cause, in the single-pulse modulation, the command voltage and the triangular carrier signal to concurrently cross the zero level while the command voltage is increasing and the triangular carrier signal is decreasing; and
   cause, in the single-pulse modulation, the command voltage and the triangular carrier signal to concurrently cross the zero level while the command voltage is decreasing and the triangular carrier signal is increasing.

9. The control apparatus according to claim 7, wherein:
   the cyclic carrier signal is a triangular carrier signal;

the number of the carrier pulses of the triangular carrier signal for each cycle of the command voltage is referred to as K;

the number K of the carrier pulses of the triangular carrier signal for each cycle of the command voltage satisfies the following equation:

$$K=3*(2d+1)$$

where d is an integer equal to or more than zero; and the controller is configured to change, in the single-pulse modulation, the number K of the carrier pulses of the triangular carrier signal for each cycle of the command voltage to a different number of a switched triangular carrier signal such that an absolute value of a difference between the number K of the triangular carrier signal and the different number of the switched triangular carrier signal is a natural-number multiple of 12.

10. The control apparatus according to claim 7, wherein:

the cyclic carrier signal is a triangular carrier signal;

the number of the carrier pulses of the triangular carrier signal for each cycle of the command voltage is referred to as K;

the number K of the carrier pulses of the triangular carrier signal for each cycle of the command voltage satisfies the following equation:

$$K=3*(2d+1)$$

where d is an integer equal to or more than zero; and the controller is configured to:
  change, in the single-pulse modulation, the number K of the carrier pulses of the triangular carrier signal for each cycle of the command voltage to a different number of a switched triangular carrier signal;
  determine whether an absolute value of a difference between the number K of the triangular carrier signal and the different number of the switched triangular carrier signal is a natural-number multiple of 6 and a natural-number multiple of 12; and
  perform one of a first task and a second task upon determining that the absolute value of the difference between the number K of the triangular carrier signal and the different number of the switched triangular carrier signal is a natural-number multiple of 6 and not a natural-number multiple of 12, the first task reversing a polarity of the switched triangular carrier signal, the second task shifting the switched triangular carrier signal by a half cycle of the switched triangular carrier signal.

11. The control apparatus according to claim 7, wherein:

the cyclic carrier signal is a triangular carrier signal;

the number of the carrier pulses of the triangular carrier signal for each cycle of the command voltage is referred to as K;

the number K of the carrier pulses of the triangular carrier signal for each cycle of the command voltage satisfies the following equation:

$$K=3*(2d+1)$$

where d is an integer equal to or more than zero; and the controller is configured to change, in the single-pulse modulation, the number K of the carrier pulses of the triangular carrier signal for each cycle of the command voltage to a different number of a switched triangular carrier signal while the command voltage and the triangular carrier signal concurrently cross the zero level such that a change direction of the command voltage and a change direction of the triangular carrier signal are opposite to each other.

* * * * *